United States Patent
Yun et al.

(10) Patent No.: US 11,130,911 B2
(45) Date of Patent: Sep. 28, 2021

(54) LIQUID CRYSTAL COMPOUND AND LIQUID CRYSTAL COMPOSITION

(71) Applicant: Shijiazhuang Chengzhi Yonghua Display Material Co., Ltd., Hebei (CN)

(72) Inventors: Guoliang Yun, Hebei (CN); Ming Li, Hebei (CN); Jinsong Meng, Hebei (CN); Zhian Liang, Hebei (CN); Gang Wen, Hebei (CN); Zhengqiang Li, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 160 days.

(21) Appl. No.: 16/398,035

(22) Filed: Apr. 29, 2019

(65) Prior Publication Data

US 2019/0256772 A1 Aug. 22, 2019

(30) Foreign Application Priority Data

May 25, 2018 (CN) .......................... 201810517591.8

(51) Int. Cl.
- *C09K 19/30* (2006.01)
- *C09K 19/12* (2006.01)
- *C09K 19/16* (2006.01)
- *C09K 19/04* (2006.01)

(52) U.S. Cl.
CPC .......... *C09K 19/3003* (2013.01); *C09K 19/12* (2013.01); *C09K 19/16* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/3025* (2013.01)

(58) Field of Classification Search
CPC ....................................................... C09K 19/30
See application file for complete search history.

(56) References Cited

U.S. PATENT DOCUMENTS

2016/0085152 A1* 3/2016 Nakafuji ............... C07C 211/58
                                                                430/323

* cited by examiner

*Primary Examiner* — Chanceity N Robinson
(74) *Attorney, Agent, or Firm* — Muncy, Geissler, Olds & Lowe, P.C.

(57) ABSTRACT

A compound represented by formula I, a negative liquid crystal composition comprising such a compound, and a liquid crystal display element or liquid crystal display comprising the compound or liquid crystal composition are provided. The compound represented by formula I contains two hydroxy groups. In an ODF process for a panel, due to an intermolecular force between the hydroxyl groups and the surface of the panel (a glass surface or an ITO electrode surface), the compound is spontaneously aligned, in a standing manner, on the panel glass or transparent ITO electrode substrate, causing liquid crystal molecules similar to the compound represented by formula ITO be vertically aligned, and UV light irradiation, a polymer layer with a rough surface is formed on the substrate by means of polymerization, and achieves the effects of PI insulation and vertical alignment of the liquid crystal molecules.

6 Claims, No Drawings

LIQUID CRYSTAL COMPOUND AND LIQUID CRYSTAL COMPOSITION

TECHNICAL FIELD

The present invention belongs to the field of liquid crystal display, and particularly relates to a liquid crystal compound, a liquid crystal composition comprising such a compound, and a liquid crystal display element or liquid crystal display comprising the liquid crystal compound or liquid crystal composition.

BACKGROUND ART

Liquid crystal media used for active matrix addressing modes such as a VA mode themselves are not perfect, for example, they have the disadvantages of an afterimage level significantly worse than that of positive dielectric anisotropy display element, a relatively slow response time, a relatively high drive voltage, etc. At this point, some new types of VA display techniques have quietly emerged: for example, a PSVA technique realises a wide viewing angle display mode similar to that of MVA/PVA, and also simplifies a CF process, such that the aperture ratio is increased while lowering the CF cost; furthermore, a higher brightness is obtained, thereby obtaining a higher contrast. In addition, since the liquid crystal of the entire panel has a pre-tilt angle, there is no domino delay phenomenon, a faster response time can also be obtained while maintaining the same drive voltage, and the after image level will also not be affected; however, due to Fine Slit densely distributed electrodes in pixels, if the electrode width cannot be evenly distributed, the problem of uneven display can easily occur. Like a UVVA technique, on the basis of keeping the advantages of the PSVA technique, since there is no Slit structure on the TFT side, the problem of display unevenness caused by uneven pixel electrode width is also improved. Although the display device is continuously developing, people are still always devoted to studying new liquid crystal compounds, such that liquid crystal media and the performances of display devices in which the liquid crystal media are used can continuously advance forward.

Polymerizable mesogenic units (RMs) are currently a very popular and important topic in the display industry, and possible application fields thereof include polymer stabilized alignment (PSA) liquid crystal display, polymer stabilized blue-phase (PS-BP) liquid crystal display, pattern retarder films, etc.

The PSA principle is being applied to different typical LC displays such as PSA-VA, PSA-OCB, PS-IPS/FFS and PS-TN liquid crystal displays. Taking the most widely used PSA-VA display as an example, the pre-tilt angle of a liquid crystal cell can be obtained by a PSA method, and the pre-tilt angle has a positive effect on the response time. For PSA-VA displays, standard MVA or PVA pixel and electrode designs can be used; however, if a specially patterned design is used in the electrode design on one side and no protrusion design is used on the other end, the production can be significantly simplified while the display is imparted with a very good contrast and a very high light transmittance.

It has been found in the prior art that LC mixtures and RMs still have some disadvantages in applications in PSA displays. For example, the panel process requires the application of PI, which not only costs a lot of manpower and material resources, but also causes the emission of organic pollutants.

SUMMARY OF THE INVENTION

The present invention provides a compound capable of achieving a self-alignment function, a liquid crystal composition comprising such a compound, a liquid crystal display element or liquid crystal display comprising the compound or liquid crystal composition, particularly a PSVA liquid crystal composition suitable for liquid crystal display or TV applications.

In order to achieve the above-mentioned beneficial technical effects, the present invention provides a compound represented by formula I:

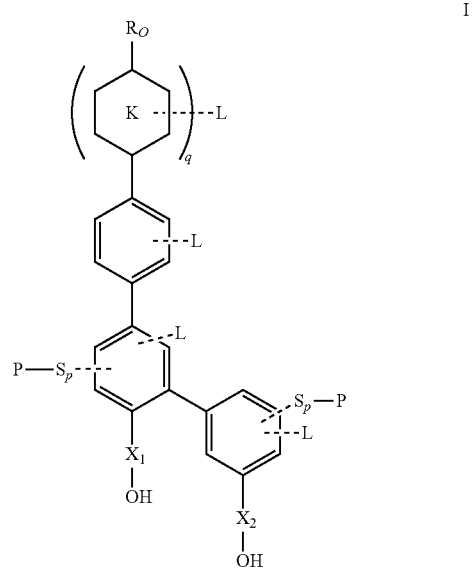

wherein $R_O$ represents an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in the group represented by $R_O$ may be substituted with cyclopentyl, cyclobutyl or cyclopropyl, and any one or more non-neighboring $CH_2$ may be substituted with O;

q represents 1 or 2;

each L independently represents F, an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in the group may be substituted with cyclopentyl, cyclobutyl or cyclopropyl, and P represents H or a polymerizable group, and Sp represents a single bond or a spacer group;

$X_1$ and $X_2$ represent an alkylene group having an atom number of 1-10, wherein any one or more $CH_2$ in the group may be substituted with cyclopentyl, cyclobutyl or cyclopropyl, and any one or more non-neighboring $CH_2$ may be substituted with O; and each

independently represents any one or more of cyclohexyl, cyclohexenyl, oxacyclohexyl and/or phenyl.

The compound represented by formula I has a better solubility in the liquid crystal composition, and is generally added in an amount of between 0.5% and 5% in the liquid crystal composition, and the compound easily absorbs UV and rapidly polymerizes, such that a polymer having an alignment function may be formed.

The compound represented by formula I has two hydroxy groups linked via linkages $X_1$ and $X_2$, and has double anchoring groups (—OH) connected to the main ring structure via $X_1$ and $X_2$; after an ODF process, it is spontaneously arranged on the surface of a panel, and after UV irradiation polymerization, a more stable pre-tilt angle is easily formed.

Where P represents a polymerizable group, a methacrylate group, an acrylate group, a vinyl group or an oxirane group is preferred;

and the spacer group represents a chain group, preferably a branched or straight chain alkyl group having a carbon atom number of 1-10, wherein any one or more non-neighboring $CH_2$ may be substituted with O, and any one or more $CH_2$ may be substituted with cyclopropyl, cyclobutyl or cyclopentyl.

The present invention further provides a liquid crystal composition comprising one or more compounds represented by formula I as mentioned above, one or more compounds represented by formula II, and one or more compounds represented by formula III:

$$R_1 - A - G - R_2 \quad \text{II}$$

$$R_3 - (E)_m - Z_1 - \underset{F}{\underset{F}{\text{(benzene)}}} - Z_2 - (F)_n - R_4 \quad \text{III}$$

wherein $R_1$, $R_2$, $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in the groups represented by $R_3$ and $R_4$ may be substituted with cyclopentyl, cyclobutyl or cyclopropyl;

$Z_1$ and $Z_2$ each independently represent a single bond, —$CH_2CH_2$— or —$CH_2O$—;

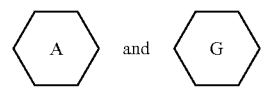

each independently represent

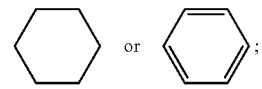 [SMILES: C1CCCCC1 ; c1ccccc1]

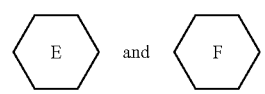

each independently represent any one or more of

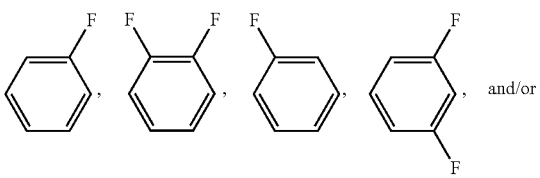

, and/or

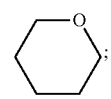

;

m represents 1 or 2; and n represents 0, 1 or 2. Said compounds represented by formula I preferably are compounds represented by formula I1 to I34; said one or more compounds represented by formula II are preferably one or more compounds represented by formula II1 to II14; and said one or more compounds represented by formula III are preferably one or more compounds represented by formula III1 to III11:

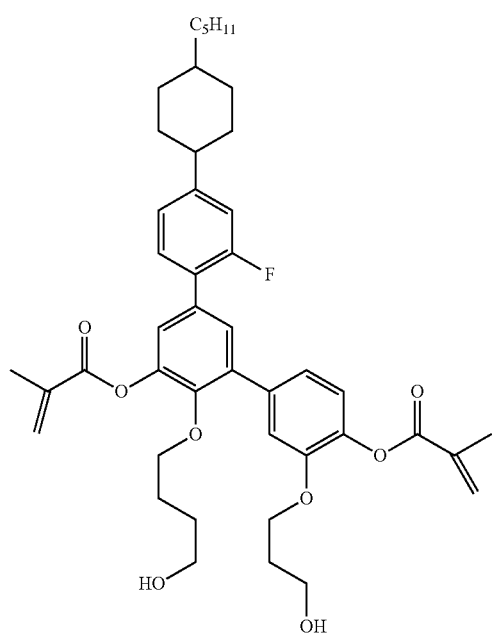
I1
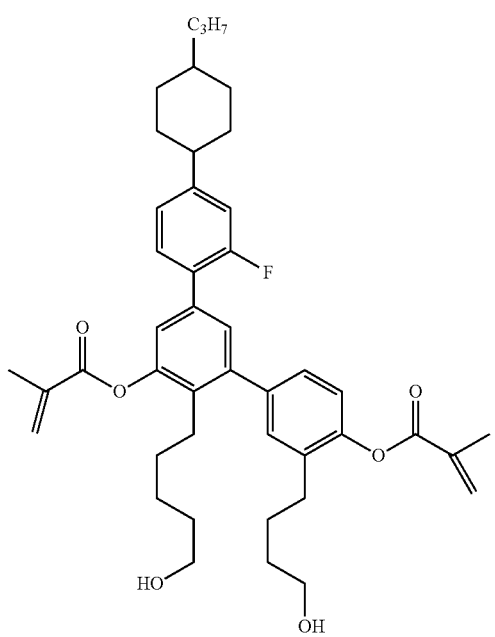
I3
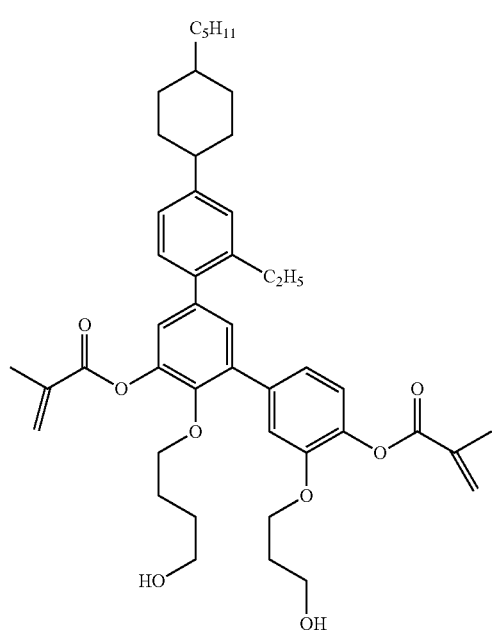
I2
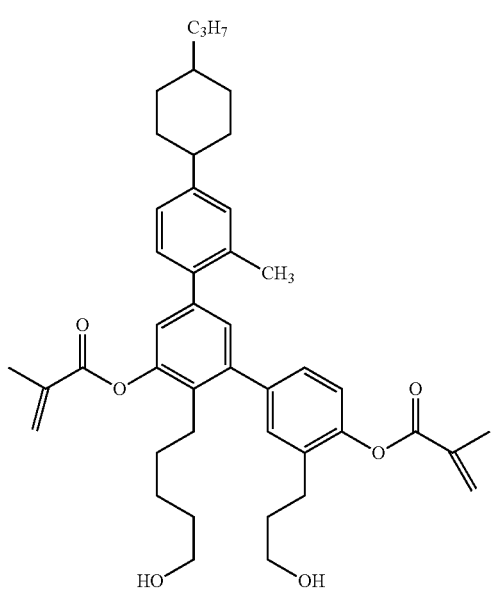
I4

I5
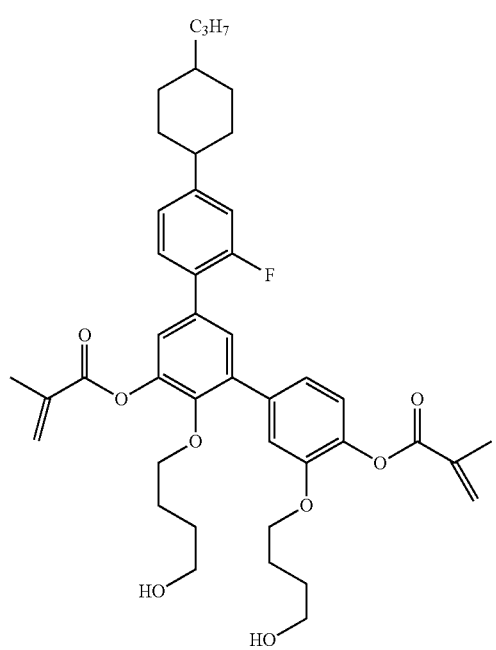
I7
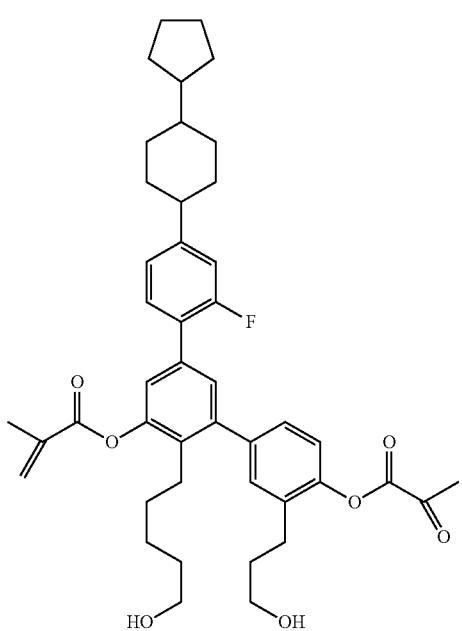
I6
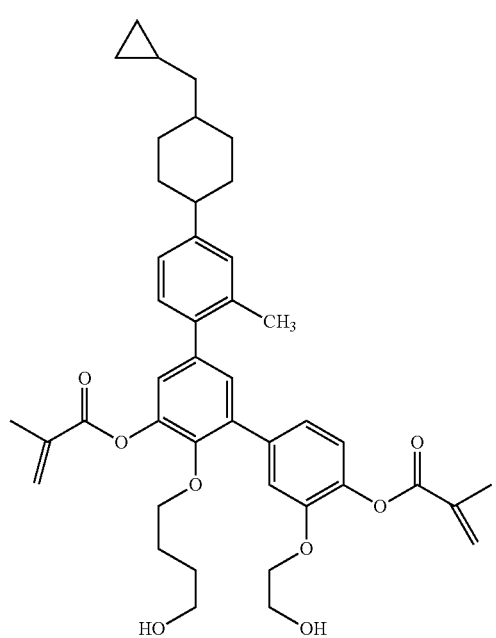
I8
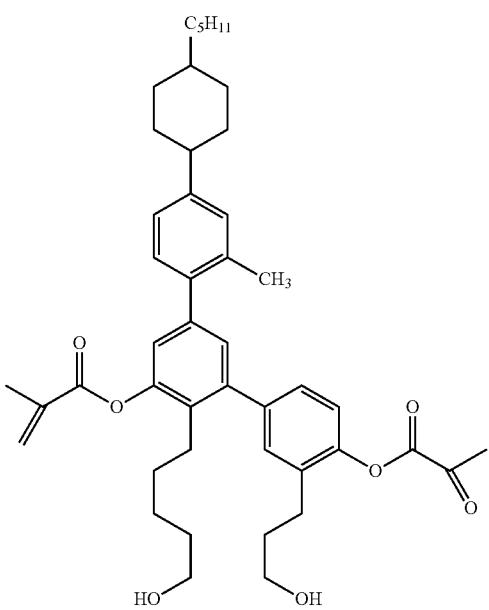

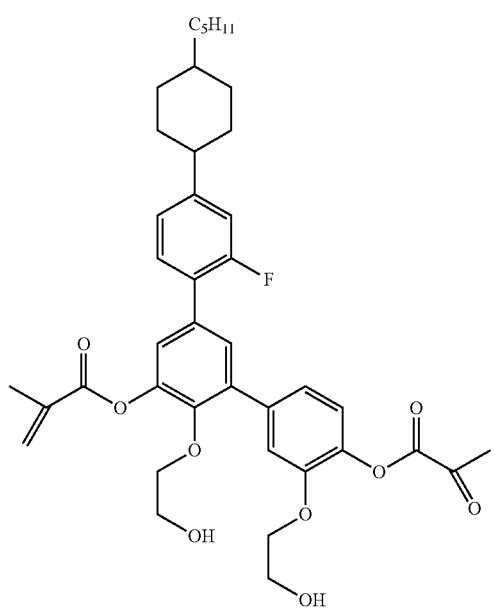
I9
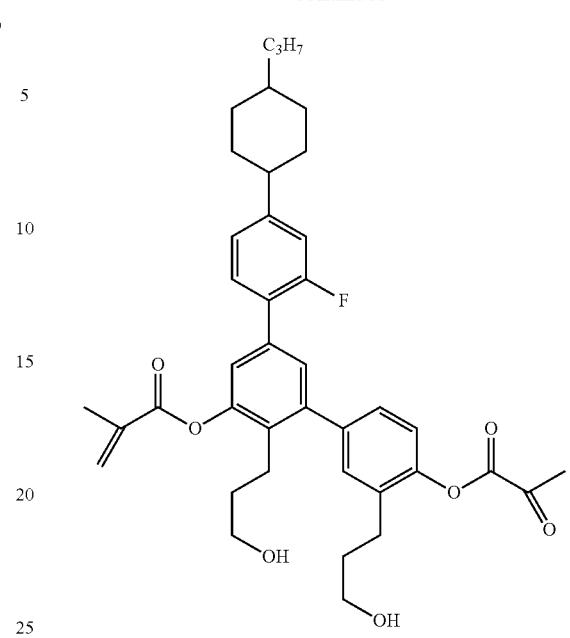
I11
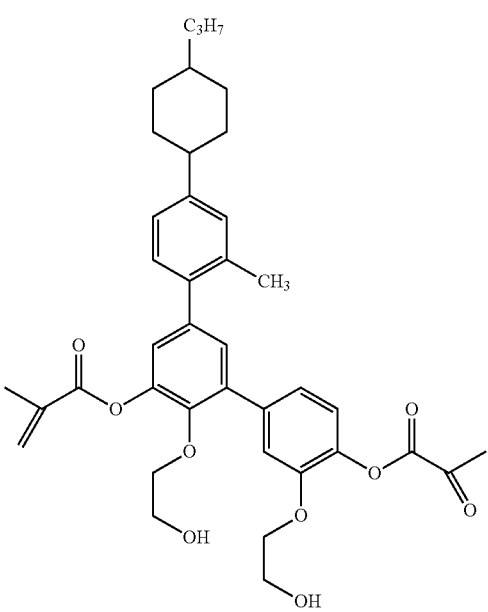
I10
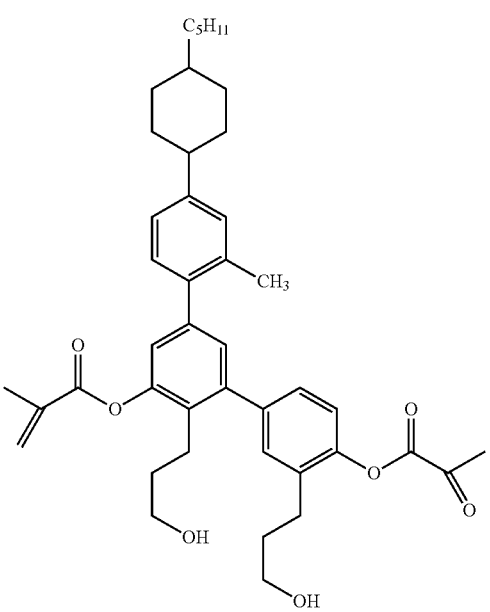
I12

I13
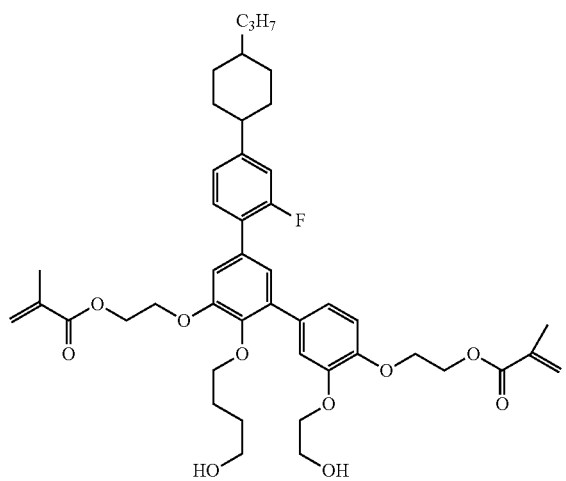
I14
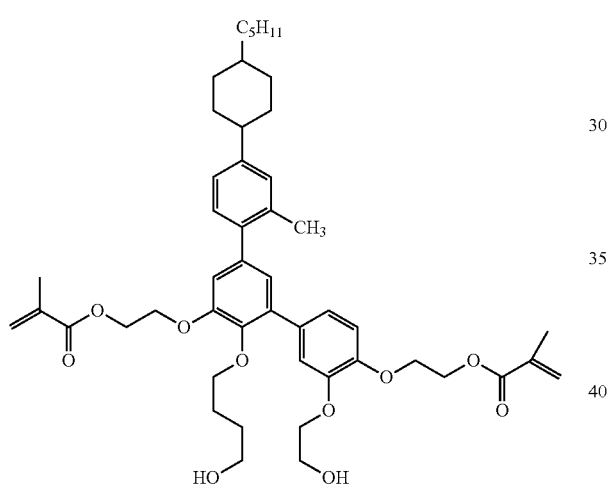
I15
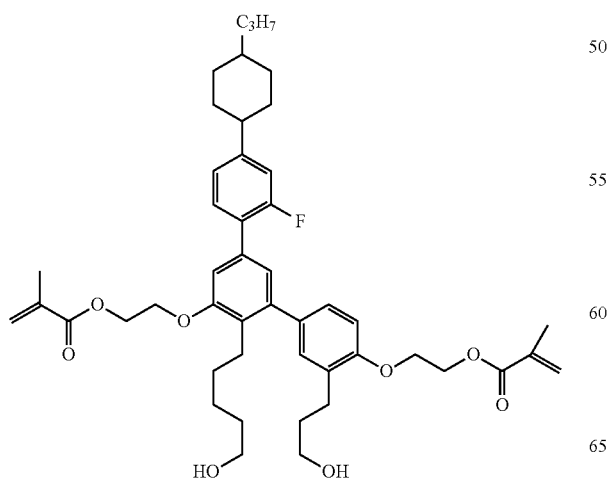
I16
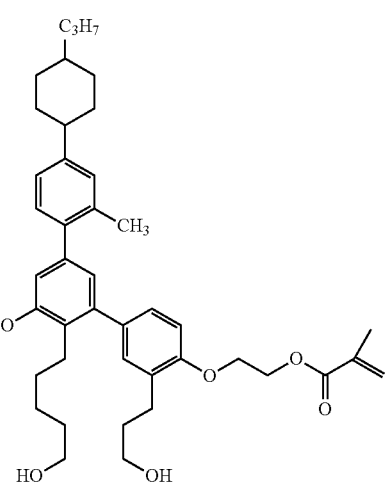
I17
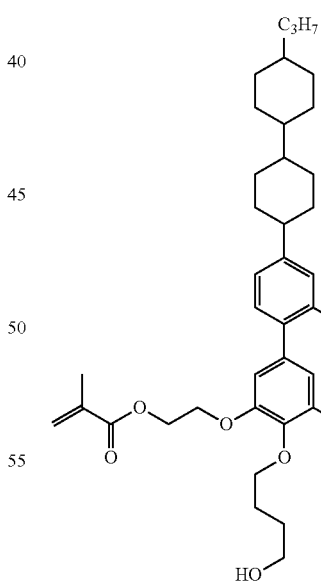

I-18
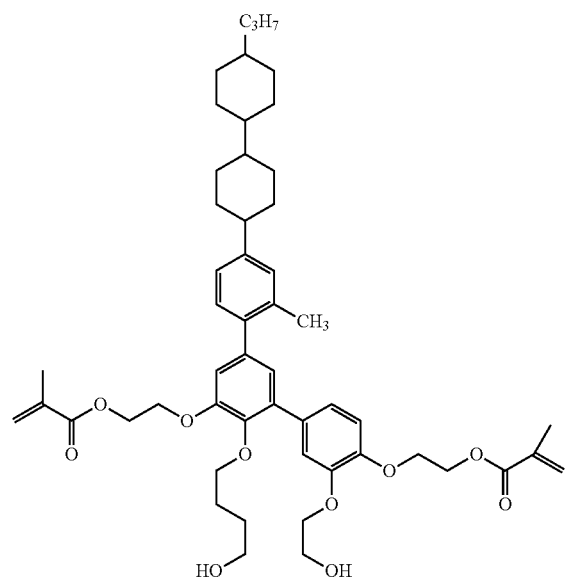
I19
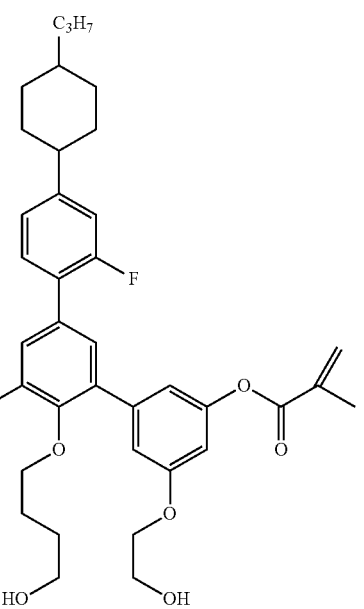
I20
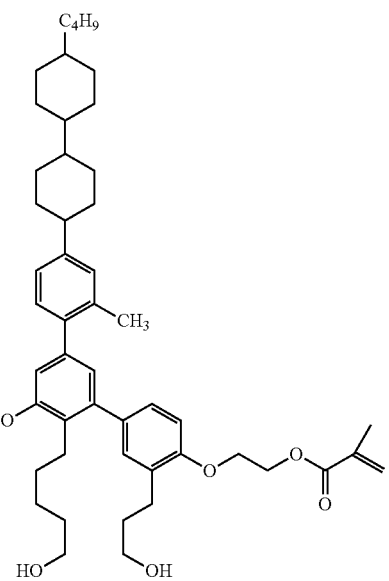
I21

15
-continued
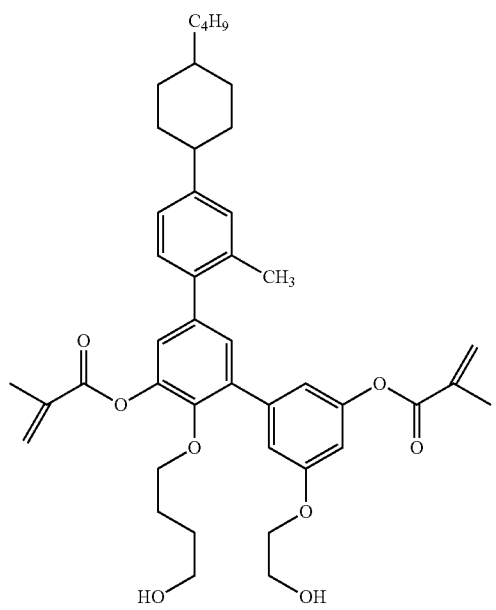
I22
16
-continued
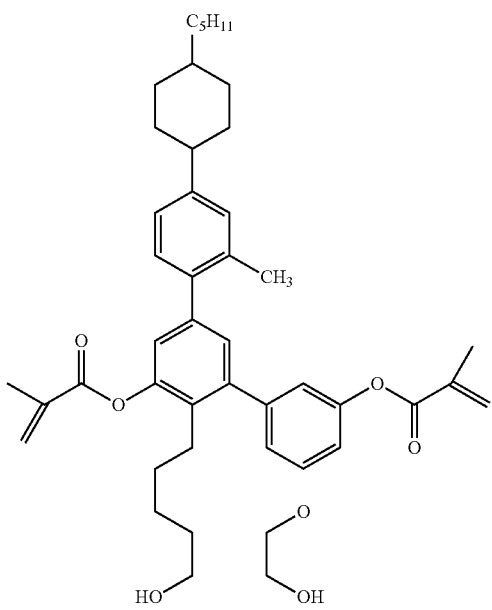
I24
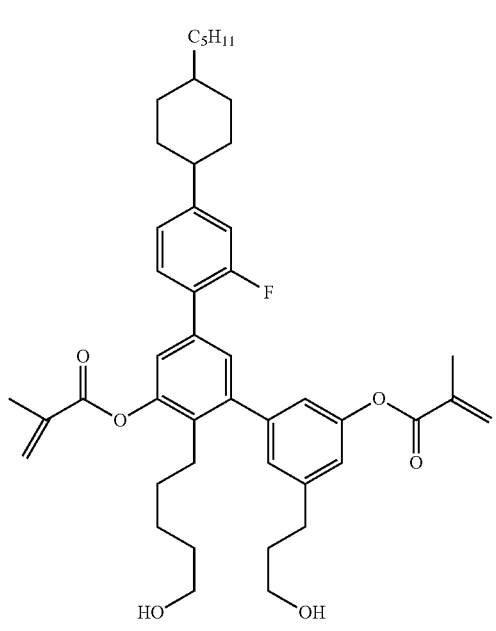
I23
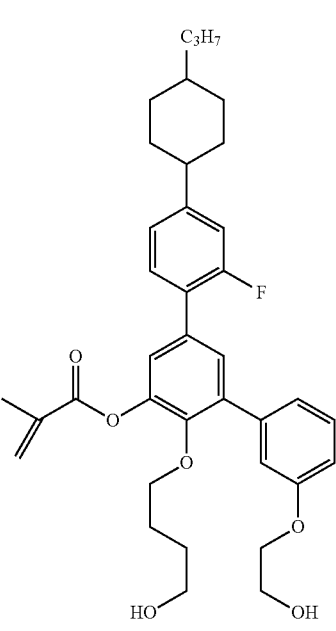
I25

I26
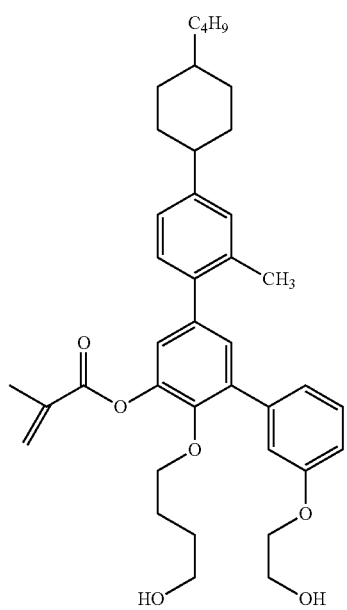
I27
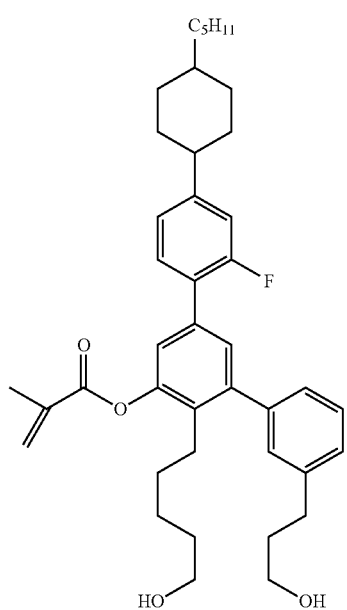
I28
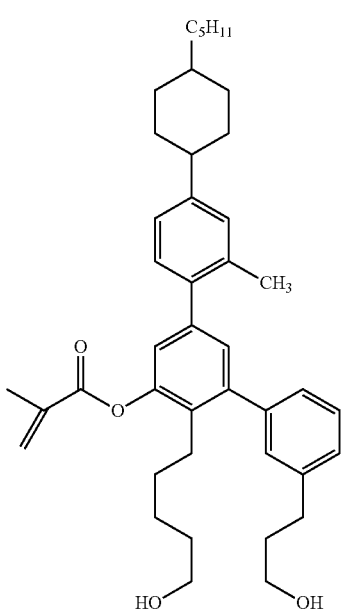
I29
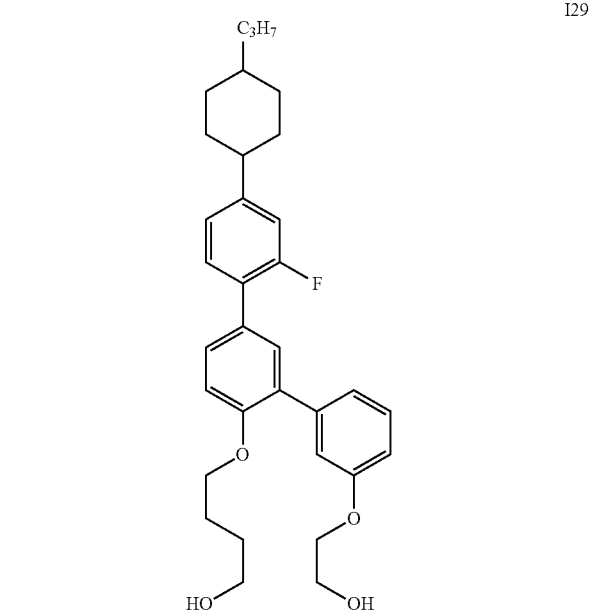

19
-continued
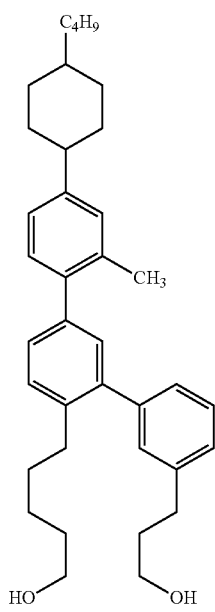
I30
20
-continued
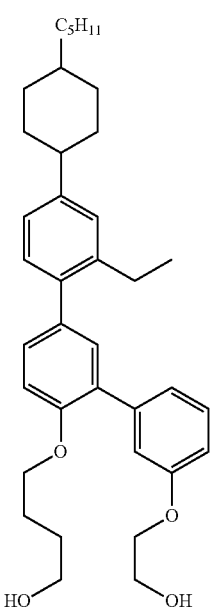
I32
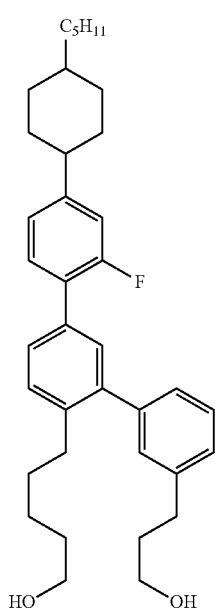
I31
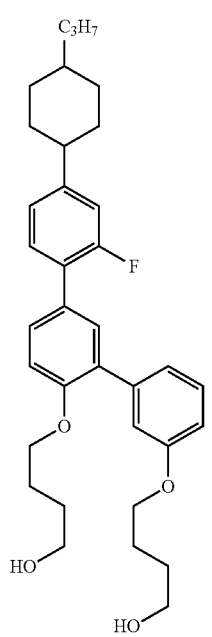
I33

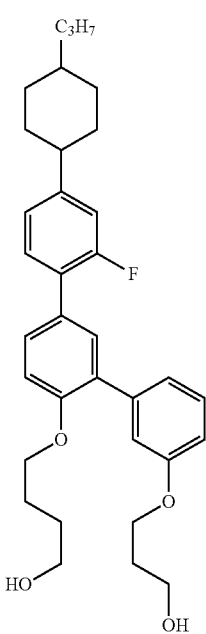
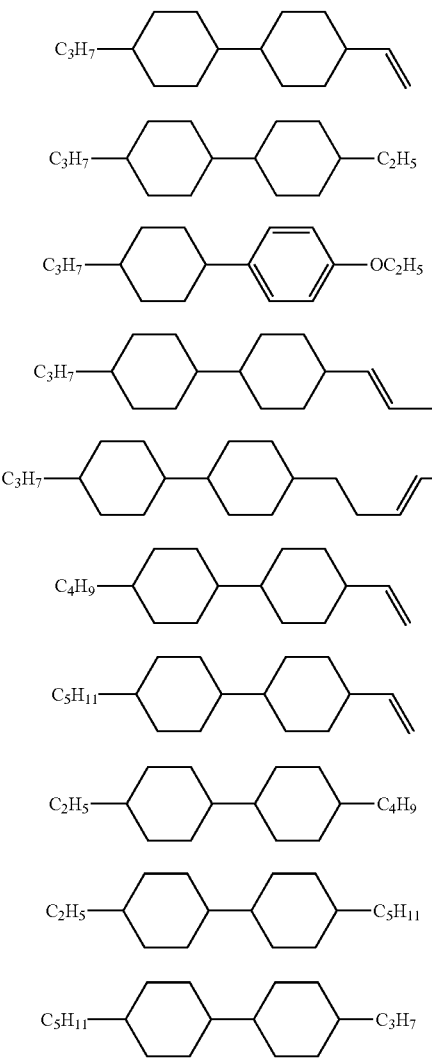
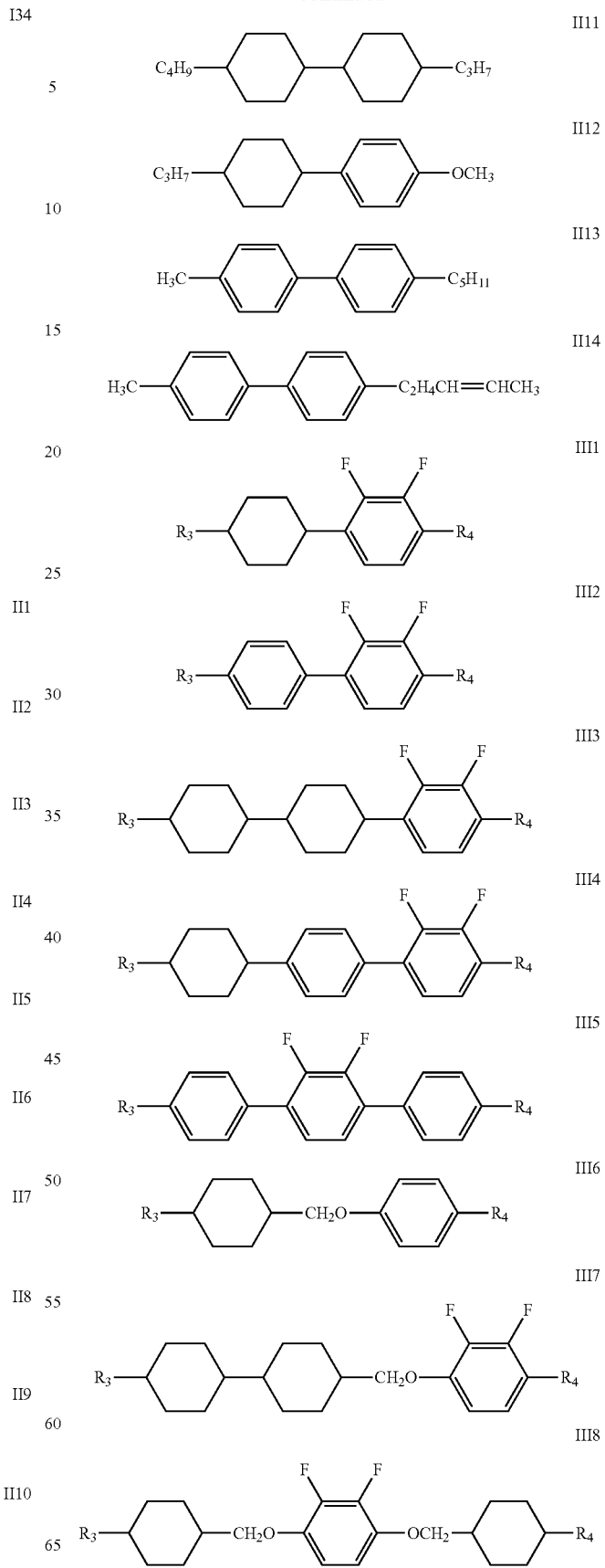

-continued

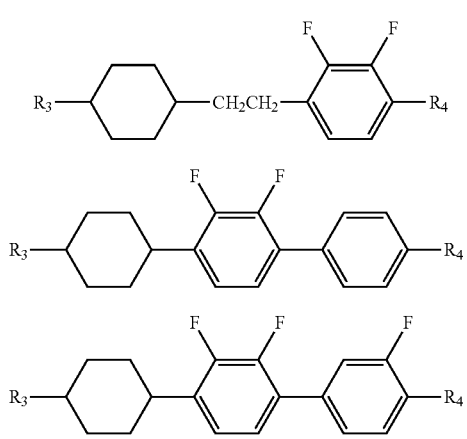

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in $R_3$ and $R_4$ may be substituted with cyclopentyl, cyclobutyl or cyclopropyl.

The liquid crystal composition provided by the present invention has a lower viscosity, can achieve a fast response, and further has a moderate dielectric anisotropy Δε, a moderate optical anisotropy Δn (0.09-0.11), and a high stability to heat and light. The liquid crystal display element or liquid crystal display comprising the liquid crystal composition has the properties of a wider nematic phase temperature range, a suitable or higher birefringence anisotropy Δn, a very high electrical resistivity, a good anti-ultraviolet property, a high charge retention ratio, a low vapor pressure, etc.

The compound represented by formula I contains two hydroxy groups. In an ODF process for a panel, due to an intermolecular force between the hydroxyl groups and the surface of the panel (a glass surface or an ITO electrode surface), the compound is spontaneously aligned, in a standing manner, on the panel glass or transparent ITO electrode substrate, causing liquid crystal molecules similar to the compound represented by formula I to be vertically aligned, and under UV light irradiation, a polymer layer with a rough surface is formed on the substrate by means of polymerization, and achieves the effects of PI insulation and vertical alignment of the liquid crystal molecules, wherein the thickness of PI is between 50 nm and 120 nm; to form the same thickness, the compound represented by formula I is added in a large amount, preferably (mass percentage) of 1% or more, and the requirements for storage stability at low temperatures are higher.

For displays using these liquid crystal compositions, after adding a compound represented by formula I to an LC medium and introducing the LC medium into an LC cell, pre-tilting of liquid crystal molecules can be formed by means of UV photopolymerization or crosslinking under the application of a voltage between electrodes. The compound represented by formula I provided by the present invention has the advantages of a good mutual solubility with other monomers, a good ultraviolet resistance, etc. As a reactive mesogen (RM), it has the advantages of a good mutual solubility, a high charge retention ratio (VHR), a high polymerization activity (less monomer residue), etc., is very suitable for use as a vertical alignment material to copolymerize with RM for use in a self-alignment agent of a liquid crystal mixture for PSA (polymer-supported alignment) and PS (polymer-stabilized) modes, which can avoid a PI process and significantly simplifies the process for a liquid crystal panel.

In addition, any one of the following products comprising a compound represented by formula I is also within the scope of the present invention:

1) liquid crystal compositions; and 2) optical anisotropic bodies of liquid crystal compositions, The solubility of the compound of formula I in the liquid crystal may vary slightly with the substituents; however, an addition amount of 0.5% to 5% in mass percentage may be achieved. Since the polymer formed from the compound of formula I is intended to act as PI for an insulation effect, a certain thickness is necessary, so that the compound of formula I should have sufficient solubility.

The addition amount (in mass percentage) of the compound of formula I in the liquid crystal composition is preferably between 0.5% and 5%, further preferably between 1% and 3%.

The addition amount (in mass percentage) of the compound represented by formula II in the liquid crystal composition is preferably between 15% and 60%, further preferably between 20% and 40%.

The addition amount (in mass percentage) of the compound represented by formula III in the liquid crystal composition is preferably between 20% and 60%, further preferably between 30% and 50%.

Said liquid crystal composition may further comprise one or more compounds represented by formula IV:

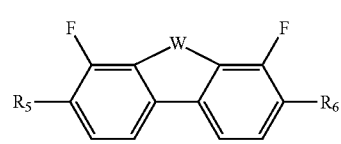

wherein $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in the groups represented by $R_5$ and $R_6$ may be replaced by cyclopentyl, cyclobutyl or cyclopropyl; and W represents O, S or —$CH_2O$—.

The compound represented by formula IV is preferably

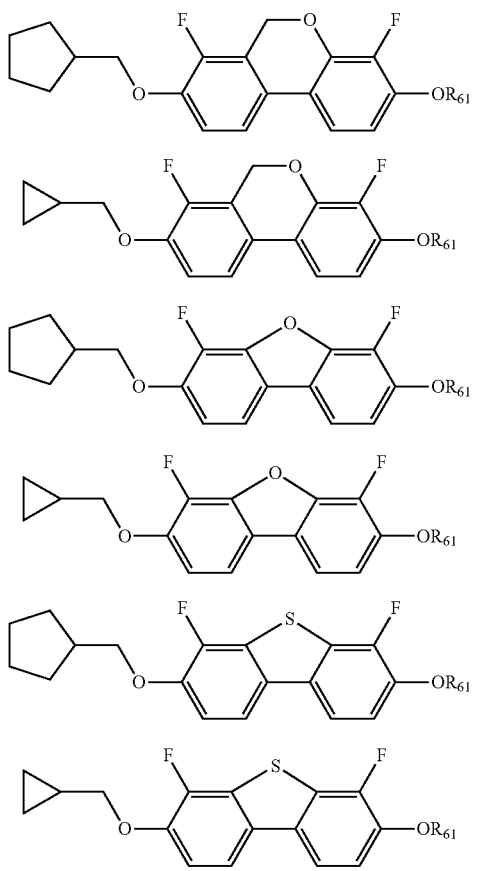

wherein each $R_{61}$ independently represents an alkyl group having a carbon atom number of 2-6.

Said liquid crystal composition further comprises one or more compounds represented by formula V:

V

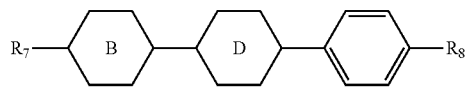

wherein $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8.

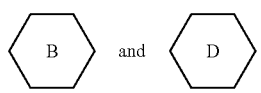

each independently represent 1,4-phenylene, 1,4-cyclohexylene, or 1,4-cyclohexenylene.

The compound represented by formula V is preferably

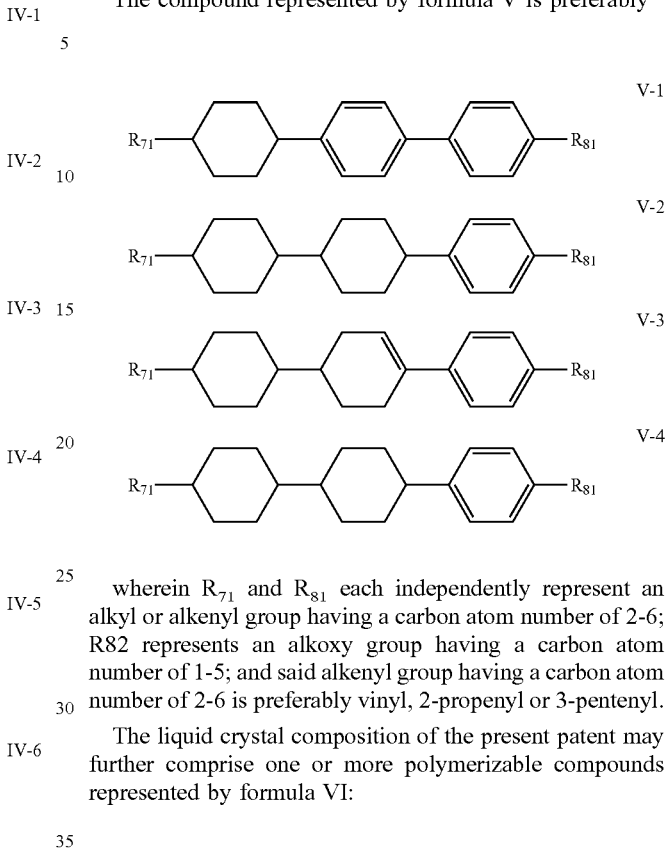

wherein $R_{71}$ and $R_{81}$ each independently represent an alkyl or alkenyl group having a carbon atom number of 2-6; R82 represents an alkoxy group having a carbon atom number of 1-5; and said alkenyl group having a carbon atom number of 2-6 is preferably vinyl, 2-propenyl or 3-pentenyl.

The liquid crystal composition of the present patent may further comprise one or more polymerizable compounds represented by formula VI:

VI

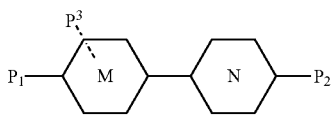

wherein

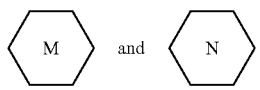

each independently represent phenylene, fluorinated phenylene, or indanyl; and $P_1$, $P_2$, and $P_3$ each independently represent a methacrylate group or an acrylate group.

The compound represented by formula VI is preferably the following compound:

VI-1

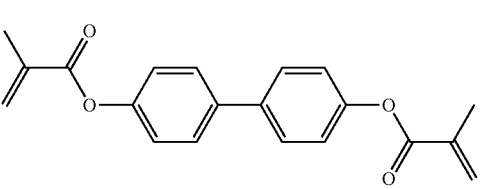

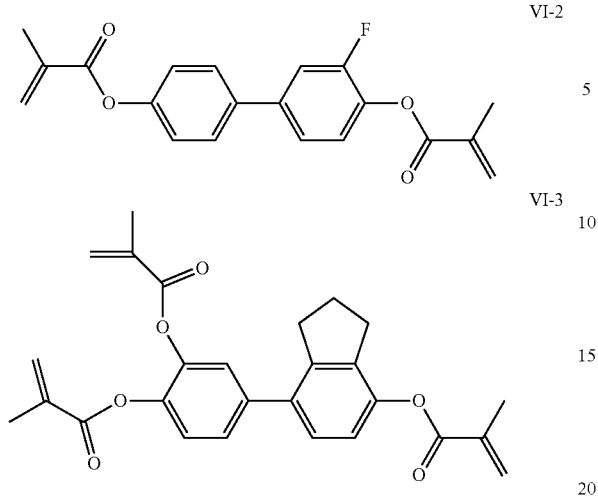

wherein the compound of formula VI has a biphenyl structure, and is slightly less sensitive to UV and has a slightly slower rate of polymerization as compared with the compound of formula I which has a triphenyl structure, and the compound of formula VI which actually forms the polymer is relatively in the surface layer.

The addition of the compound of formula VI for copolymerization with the compound of formula I can improve the display effect, and the polymer layer provides a sustained and stable pre-tilt, and the pre-tilt of the liquid crystal molecules is very favorable for improving the response speed of the liquid crystal in an electric field.

The compound of formula VI is generally added in an amount of between 0.1% and 1% (in mass percentage), preferably 0.2% to 0.5% (in mass percentage).

Different proportions of the components of the liquid crystal composition will exhibit slightly different properties, for example, the dielectric anisotropy Δε, optical anisotropy Δn, the transition temperature point CP at which the nematic phase of the liquid crystal is transformed into liquid, and the stability at low temperatures may all be different; however, the common characteristic is that the rotary viscosities γ1 thereof are lower. The application thereof to a liquid crystal display device can achieve a fast response. The liquid crystal composition has a high stability to heat and light. The liquid crystal display element or liquid crystal display comprising the liquid crystal composition has the properties of a wider nematic phase temperature range, a suitable or higher birefringence anisotropy Δn, a very high electrical resistivity, a good anti-ultraviolet property, a high charge retention ratio, a low vapor pressure, etc. PSVA liquid crystal compositions suitable for display or TV applications, especially after a long time of operation, have no or significantly reduced image sticking.

To the liquid crystal compound of the present invention, various functional dopants may be further added, wherein the content of the dopants is preferably between 0.01% and 1% (in mass percentage), and these dopants mainly include an antioxidant, an ultraviolet absorber and a chiral agent.

The antioxidant and the ultraviolet absorber are preferably:

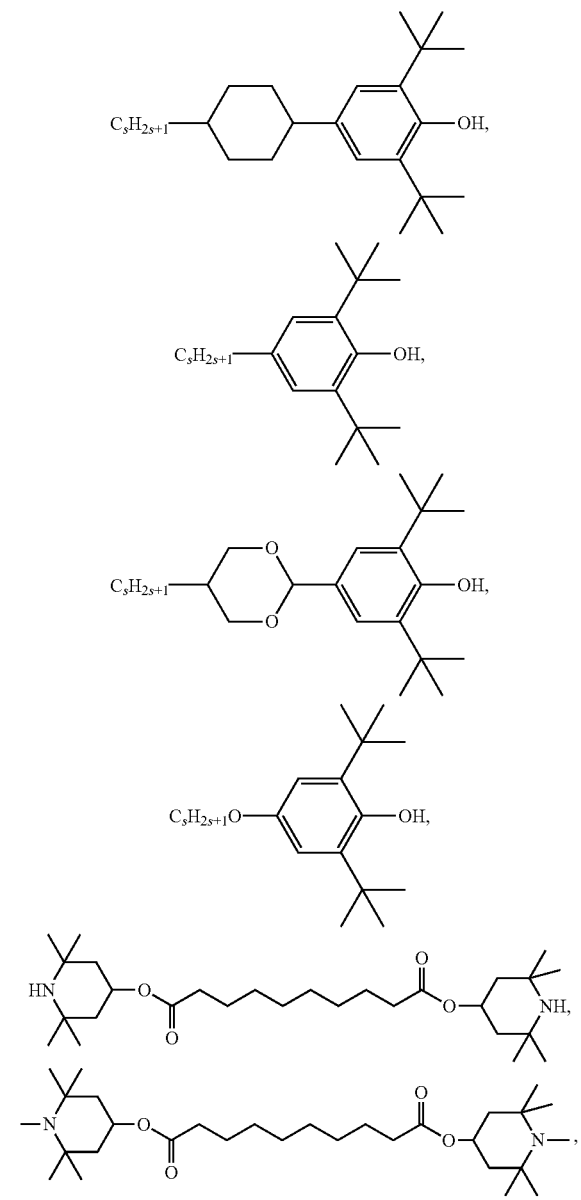

with S representing an integer of from 1 to 10.

The present invention further relates to a liquid crystal display element or liquid crystal display comprising any liquid crystal composition as mentioned above; and said display element or display is an active matrix display element or display or a passive matrix display element or display.

Said liquid crystal display element or liquid crystal display is preferably an active matrix addressing liquid crystal display element or liquid crystal display.

Said active matrix display element or display is specifically a PSVA-TFT or IPS-TFT liquid crystal display element or display.

DETAILED DESCRIPTION OF EMBODIMENTS

The present invention is further described in conjunction with particular examples below, but is not limited to the following examples. The methods are all conventional methods, unless otherwise specified. The raw materials are all commercially available, unless otherwise specified.

The reaction process is generally monitored through TLC, and the post-treatments after the reaction is completed are generally water washing, extracting, combining organic phases and then drying, evaporating and removing the solvent under a reduced pressure, recrystallization and column chromatographic separation; and a person skilled in the art would be able to achieve the present invention according to the following description.

In the present specification, the percentages are mass percentages, the temperatures are in degree Celsius (° C.), and the specific meanings of other symbols and the test conditions are as follows:

Cp represents the clearing point (° C.) of a liquid crystal as measured by means of a DSC quantitative method;

S—N represents the melting point (° C.) for the transformation of a liquid crystal from a crystal state to a nematic phase;

$\Delta n$ represents optical anisotropy, with $\Delta n_e - n_o$, wherein $n_o$ is the refractive index of an ordinary light, and $n_e$ is the refractive index of an extraordinary light, with the test conditions being: 25±2° C., 589 nm and using an abbe refractometer for testing;

$\Delta \varepsilon$ represents dielectric anisotropy, with $\Delta \varepsilon = \varepsilon// - \varepsilon\perp$, in which $\varepsilon//$ is a dielectric constant parallel to a molecular axis, and $\varepsilon\perp$ is a dielectric constant perpendicular to the molecular axis, with the test conditions being 25±0.5° C., a 20 micron parallel cell, and INSTEC: ALCT-IR1 for testing;

$\gamma 1$ represents a rotary viscosity (mPa·s), with the test conditions being 25±0.5° C., a 20 micron parallel cell, and INSTEC: ALCT-IR1 for testing; and $\rho$ represents electrical resistivity ($\Omega$·cm), with the test conditions being: 25±2° C., and the test instruments being a TOYO SR6517 high resistance instrument and an LE-21 liquid electrode.

VHR represents a voltage holding ratio (%), with the test conditions being: 20±2° C., a voltage of ±5 V, a pulse width of 10 ms, and a voltage holding time of 16.7 ms. The test equipment is a TOYO Model 6254 liquid crystal performance comprehensive tester.

$\tau$ represents response time (ms), with the test instrument being DMS-501 and the test conditions being: 25±0.5° C., a test cell that is a 3.3 micron IPS test cell, an electrode spacing and an electrode width, both of which are 10 microns, and an included angle between the frictional direction and the electrode of 10°.

T (%) represents transmittance, with T (%)=100%* bright state (Vop) luminance/light source luminance, with the test instrument being DMS501, and the test conditions being: 25±0.5° C., a test cell that is a 3.3 micron IPS test cell, an electrode spacing and an electrode width, both of which are 10 microns, and an included angle between the frictional direction and the electrode of 10°.

The compound represented by formula I may be prepared by means of the following illustrative synthesis route:

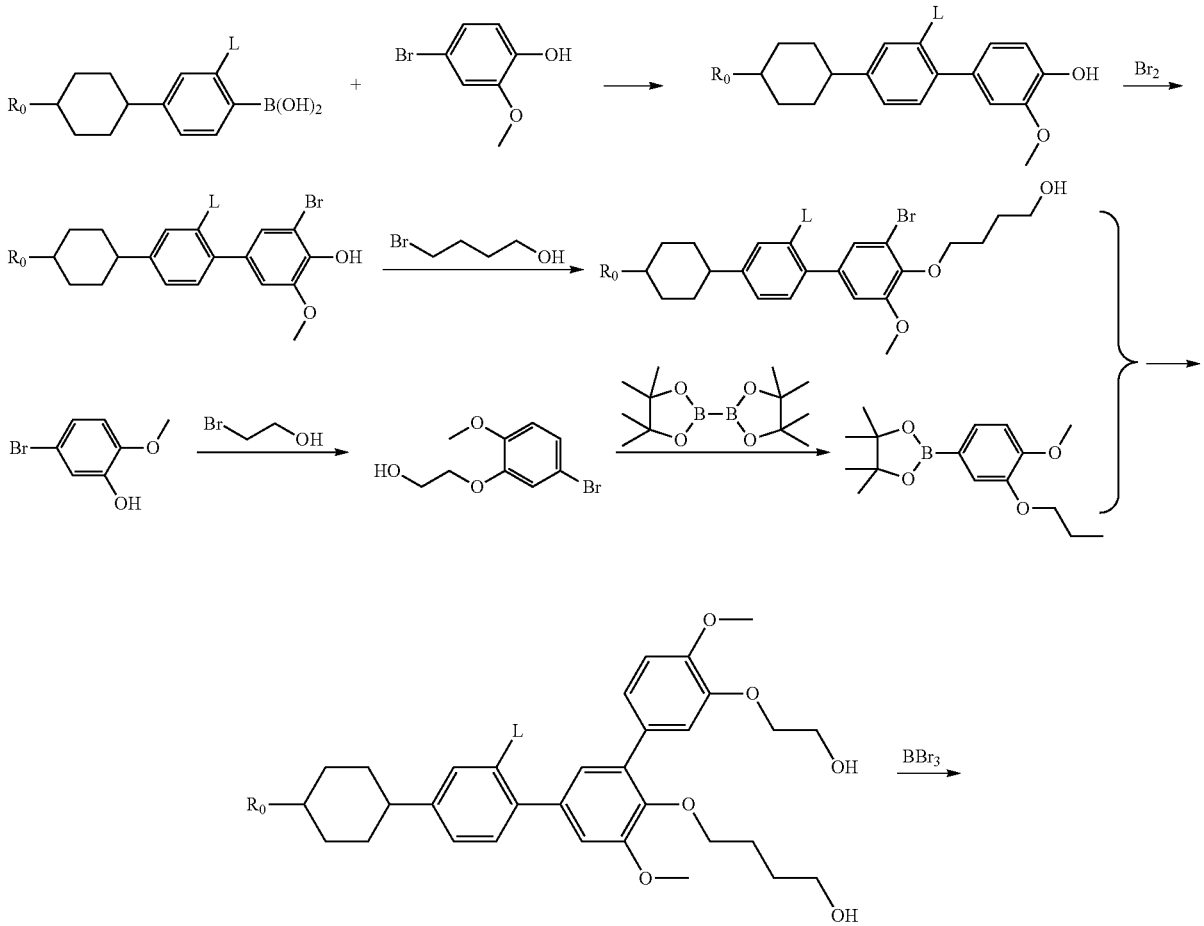

-continued
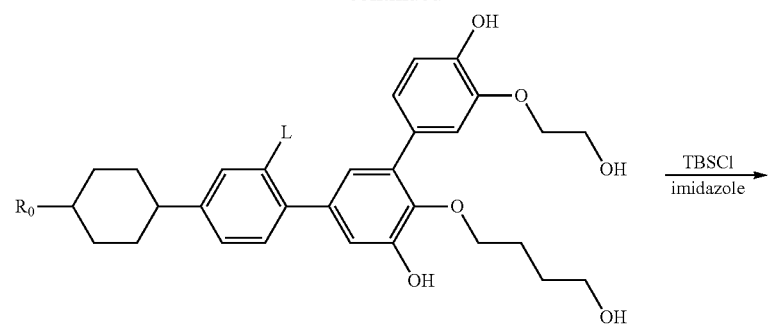
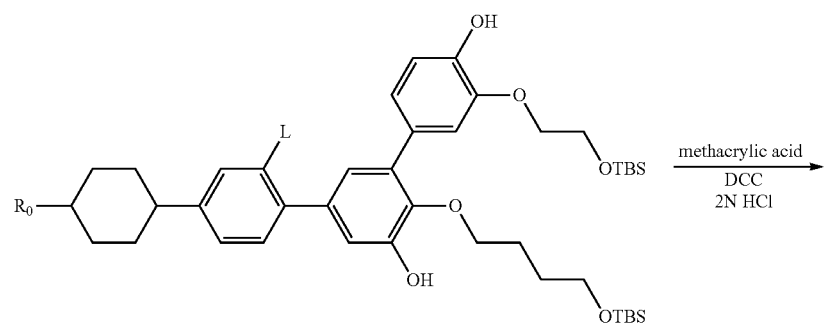
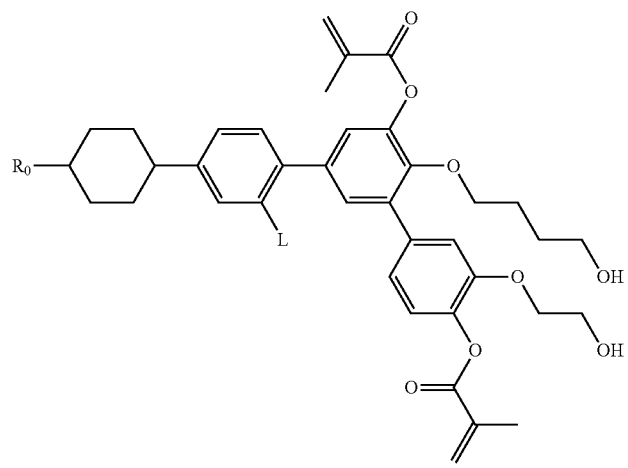
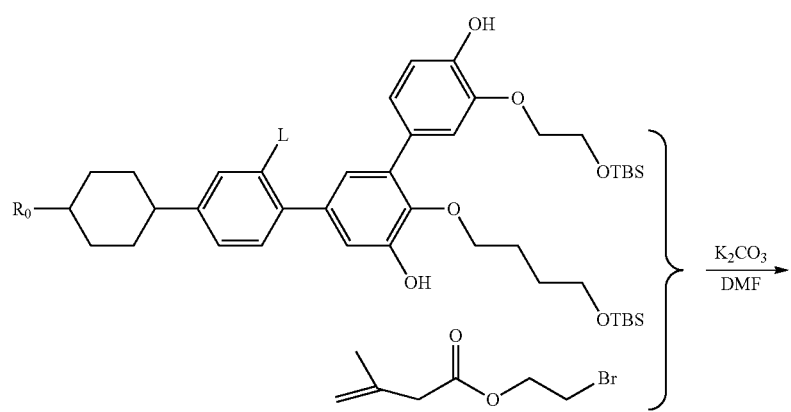

-continued

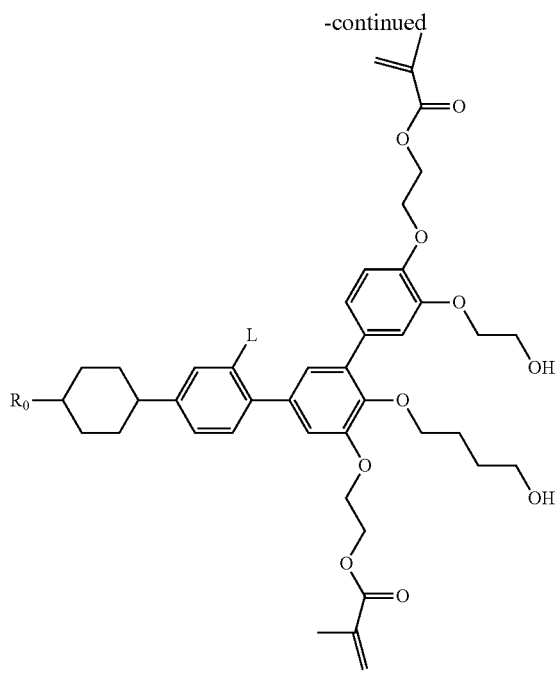

wherein $R_0$ and L are as defined in claim 1.

$R_0$ is preferably n-propyl, n-pentyl, or cyclopropylmethyl, and L is preferably F, methyl, or ethyl.

In the examples of the invention of the present application, liquid crystal monomer structures are represented by codes, and the codes for ring structures, end groups and linking groups of liquid crystals are represented as in Tables (I) and (II) below

TABLE (I)

| Codes corresponding to ring structures | |
|---|---|
| Ring structure | Corresponding code |
| cyclohexane-1,4-diyl | C |
| benzene-1,4-diyl | P |
| 3-fluoro-benzene-1,4-diyl | G |
| 2-fluoro-benzene-1,4-diyl | Gi |
| 2,3-difluoro-benzene-1,4-diyl | Y |

TABLE (I)-continued

| Codes corresponding to ring structures | |
|---|---|
| Ring structure | Corresponding code |
| difluoro-chromene | Sa |
| difluoro-dibenzofuran | Sb |
| difluoro-dibenzothiophene | Sc |

TABLE (II)

| Codes corresponding to end groups and linking groups | |
|---|---|
| End group and linking group | Corresponding code |
| $C_nH_{2n+1}-$ | n- |
| $C_nH_{2n+1}O-$ | nO— |
| $-OCF_3$ | —$OCF_3$ |
| $-CF_2O-$ | —$CF_2O$— |
| $-CH_2O-$ | —O— |
| —F | —F |
| —CN | —CN |
| $-CH_2CH_2-$ | —E— |
| —CH=CH— | —V— |
| —C≡C— | —W— |
| —COO— | —COO— |
| $-CH=CH-C_nH_{2n+1}$ | Vn— |

TABLE (II)-continued

Codes corresponding to end groups and linking groups

| End group and linking group | Corresponding code |
|---|---|
| 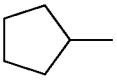 | C(5)- |

EXAMPLES

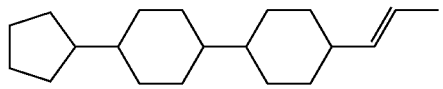 CC-C(5)-V1

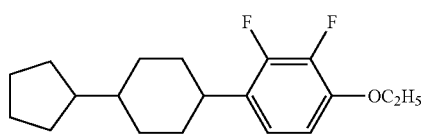 CY-C(5)-O2

Example 1

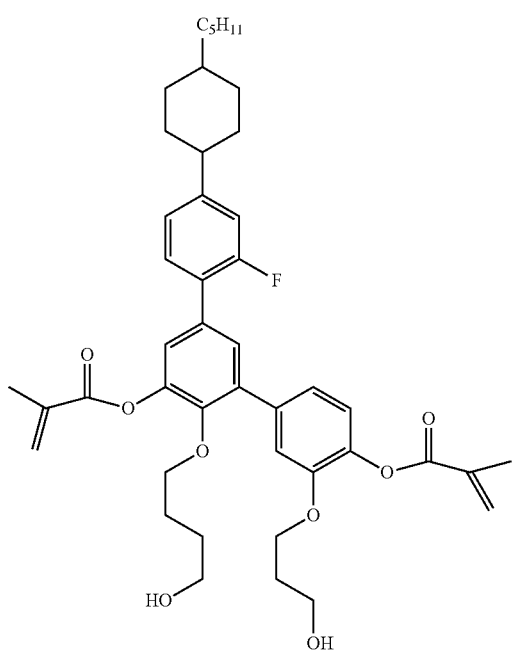 I-1

Step 1

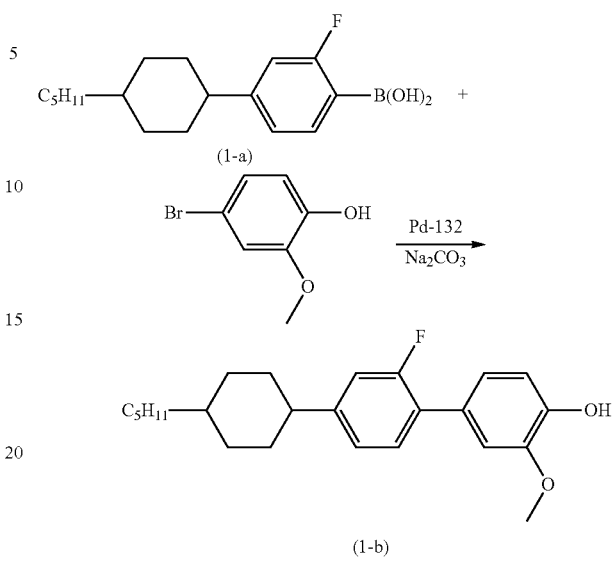

29.2 g (0.1 mol) of compound (1-a) and 20.3 g (0.1 mol) of o-methoxy-p-bromophenol are put into a 500 ml three-necked flask, 25.4 g of anhydrous sodium carbonate, 100 ml of toluene, 100 ml of water and 80 ml of ethanol are added, 0.1 g of Pd-132 is added with heating and stirring, and a reaction is carried out for 4 hours under reflux.

200 ml of water is added, it is adjusted to acidic with diluted hydrochloric acid, liquid separation is carried out, the organic phase is washed with water, is subjected to reduced pressure distillation to remove the solvent, dissolved in petroleum ether+toluene, passes through a silica gel column, and is recrystallized to obtain 33.5 g of a white crystal (1-b), with GC: 99.2% and a yield of 90%.

Step 2

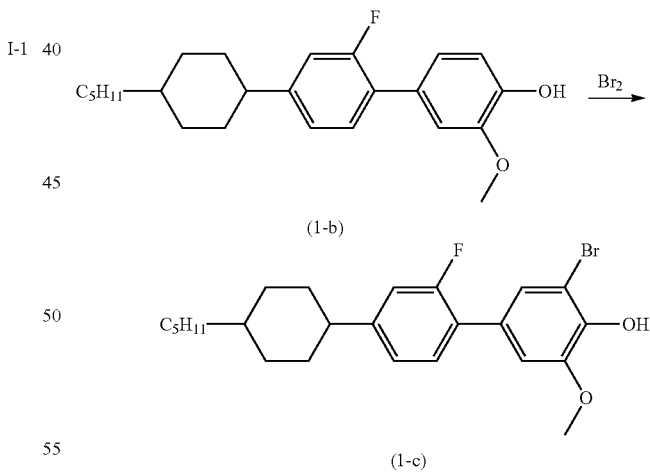

33.5 g of the white crystal (1-b) is dissolved in 150 ml of CCl4, 0.2 g of Fe powder is added, 16 g of liquid bromine is dropwise added at room temperature in 1 hour, during which the color fades rapidly, an off-gas is absorbed in an alkali liquid, the bromide color is washed away with a sodium hydrogen sulfite solution after half an hour since the addition is complete, the organic phase is washed with water, the solvent is removed by means of reduced pressure distillation, and after recrystallization from toluene+ethanol, 33.1 g of a white crystal (1-c) is obtained, with GC: 98.7% and a yield of 82%.

Step 3

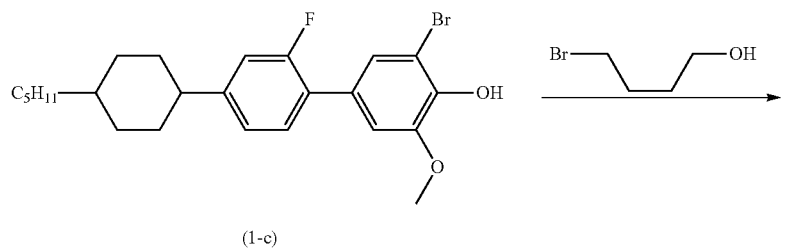

(1-c)

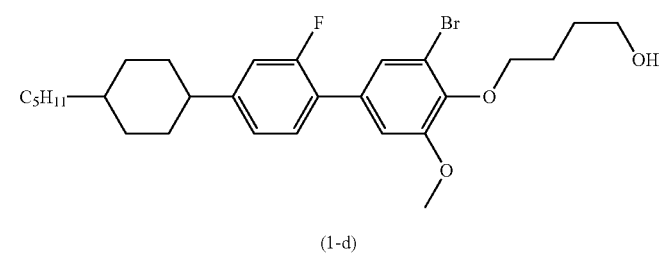

(1-d)

33.1 g (0.074 mol) of the white crystal (1-c) is dissolved in 150 ml of DMF, 10.6 g of sodium carbonate is added, 15.3 g (0.1 mol) of 4-bromobutanol is dropwise added, and a reaction is carried out at 80° C. for 6 hours.

The product is poured to 500 ml of water, toluene extraction is carried out, the organic phase is washed with water, and after recrystallization in toluene+ethanol, 33.1 g of a compound (1-d) is obtained, with GC: 98.4% and a yield of 86%.

Step 4

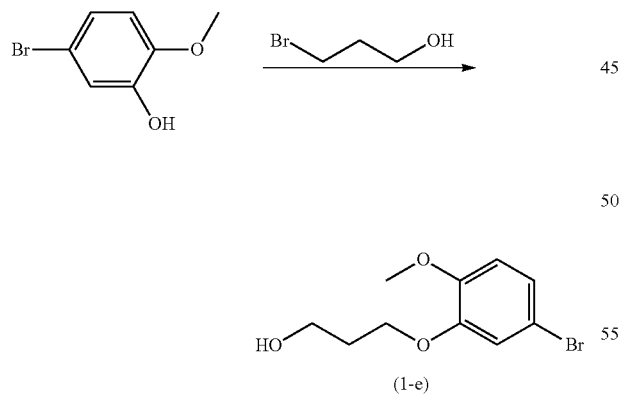

(1-e)

20.3 g (0.1 mol) of 3-bromo-2-metoxyphenol is dissolved in 100 ml of DMF, 13.8 g of sodium carbonate is added, 20.7 g (0.15 mol) of 3-bromopropanol is dropwise added at 80° C., and a reaction is carried out at 80° C. for 6 hours.

The product is poured to 300 ml of water, toluene extraction is carried out, the organic phase is washed with water, and after recrystallization in ethanol, 19.8 g of a compound (1-e) is obtained, with GC: 98.4% and a yield of 76%.

Step 5

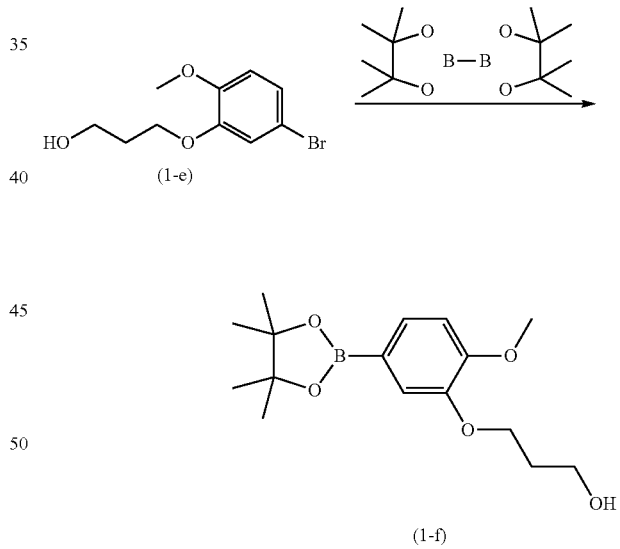

(1-f)

The 19.8 g (0.076 mol) of compound (1-e), 25.3 g of a diboron ester, 8.2 g of anhydrous sodium carbonate, 100 ml of toluene, 100 ml of ethanol, 80 ml of water, and 0.4 g of tetrakistriphenylphosphine palladium are added together into a 500 ml three-necked flask, and heated to reflux with stirring for 4 hours.

The reaction liquid is washed with water, the organic phase is subjected to reduced pressure distillation to remove the solvent, and after recrystallization from ethanol, 19.5 g of a light yellow crystal (1-f) is obtained, with GC: 97.4% and a yield of 83%.

Step 6

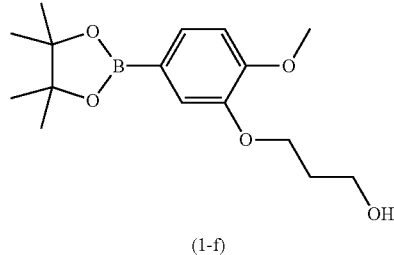

(1-f)

+

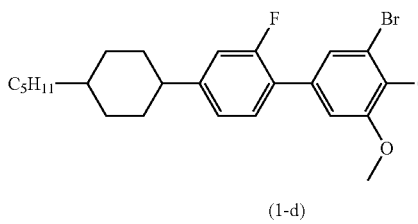

(1-d)

Pd-132 ↓

-continued

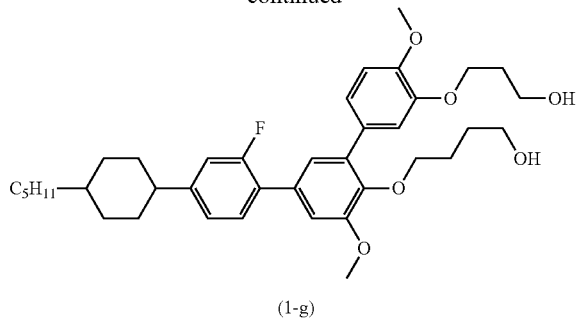

(1-g)

The 19.5 g of light yellow crystal (1-f), the 33.1 g of compound (1-d), 10.6 g of anhydrous sodium carbonate, 400 ml of toluene, 200 ml of ethanol, 150 ml of water, and 0.5 g of tetrakistriphenylphosphine palladium are added together into a 500 ml three-necked flask, and heated to reflux with stirring for 4 hours.

The reaction liquid is washed with water, the organic phase is subjected to reduced pressure distillation to remove the solvent, and after recrystallization from toluene, 29.1 g of a white crystal (1-g) is obtained, with GC: 98.4% and a yield of 75%.

Step 7

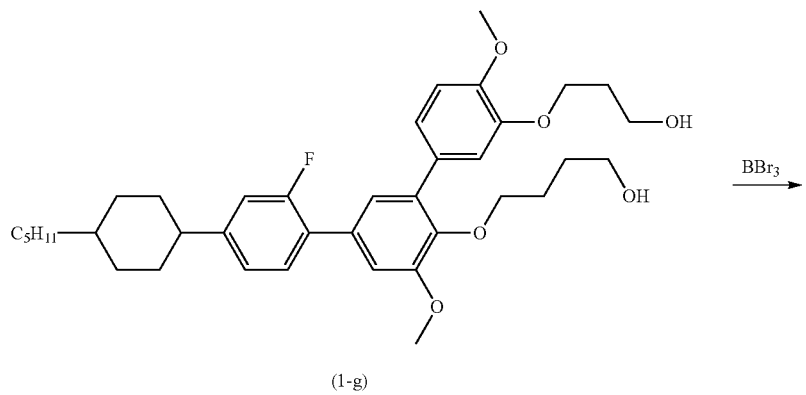

(1-g)

BBr₃ →

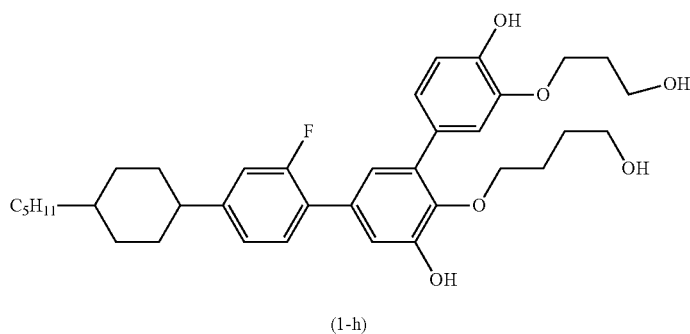

(1-h)

The 29.1 g (0.047 mol) of white crystal (1-g) is dissolved in 500 ml of dichloromethane, 35.8 g (0.143 mol) of BBr3 is dropwise added at −30° C., and the mixture is stirred at a maintained temperature for 3 hours.

200 ml of water is added, an organic phase is separated, washed with water until neutral, and subjected to recrystallization from toluene+ethanol to obtain 22.1 g of an off-white solid (1-h), with HPLC: 97.4% and a yield of 81%.

Step 8

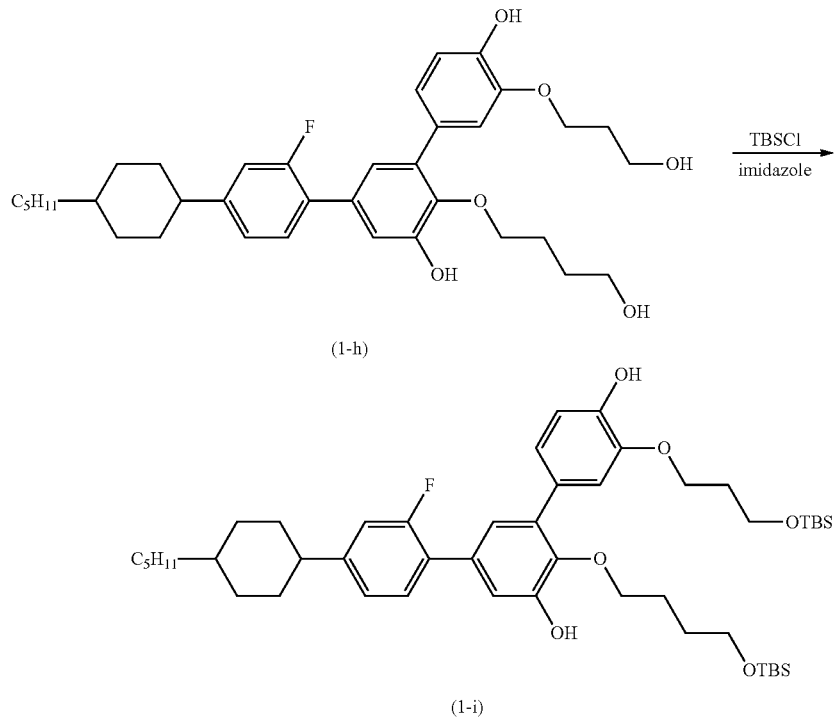

The 22.1 g (0.037 mol) of an off-white solid (1-h) and 2.8 g (0.041 mol) of imidazole are added to 200 ml of tetrahydrofuran, and cooled to 0° C. under the protection of nitrogen gas, 5.9 g (0.039 mol) of tert-butyldimethylsilyl chloride is dropwise added within 40 minutes, and the mixture is stirred at a maintained temperature for 1.5 hours.

500 ml of an ammonium chloride aqueous solution is added, methyl tert-butyl ether is added for extraction, an organic phase is separated, washed with water until neutral, dried over anhydrous sodium sulfate and then subjected to spin drying to remove the solvent, and after recrystallization from toluene+ethanol, 19.2 g of an off-white solid (1-i) is obtained, with HPLC: 96.8% and a yield of 63%.

Step 9

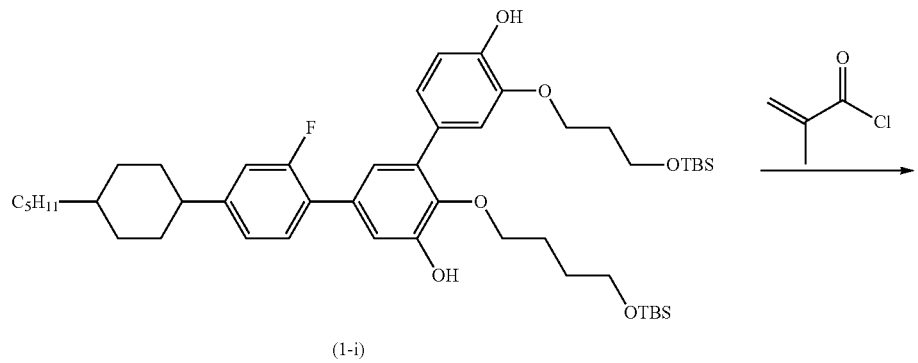

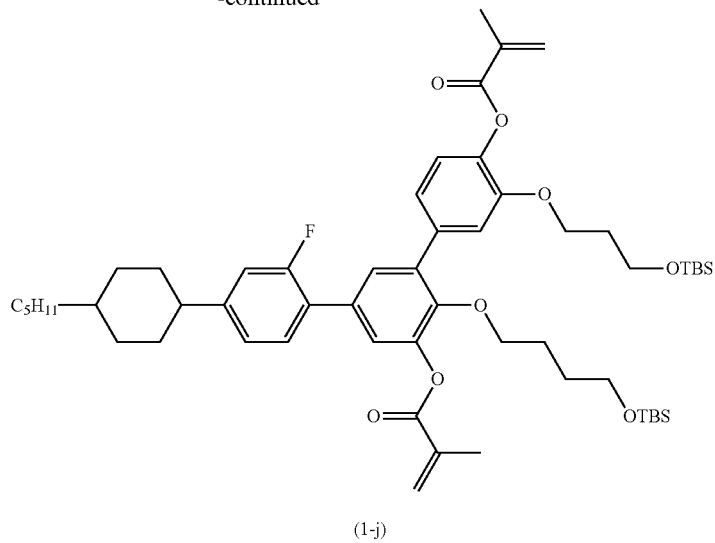

(1-j)

19.2 g (0.023 mol) of (1-h) is put into a 500 ml three-necked flask, 150 ml of dichloromethane and 7.1 g (0.070 mol) of triethylamine are added, methacryloyl chloride is dropwise added at room temperature, and after the addition is complete, a stirred reaction is carried out for 5 hours.

200 ml of water is added, an organic phase is separated, washed with water until neutral, dried over anhydrous sodium sulfate and then subjected to spin drying to remove the solvent, and after recrystallization from toluene+ethanol, 15.3 g of an off-white solid (1-j) is obtained, with HPLC: 98.1% and a yield of 69%.

Step 10

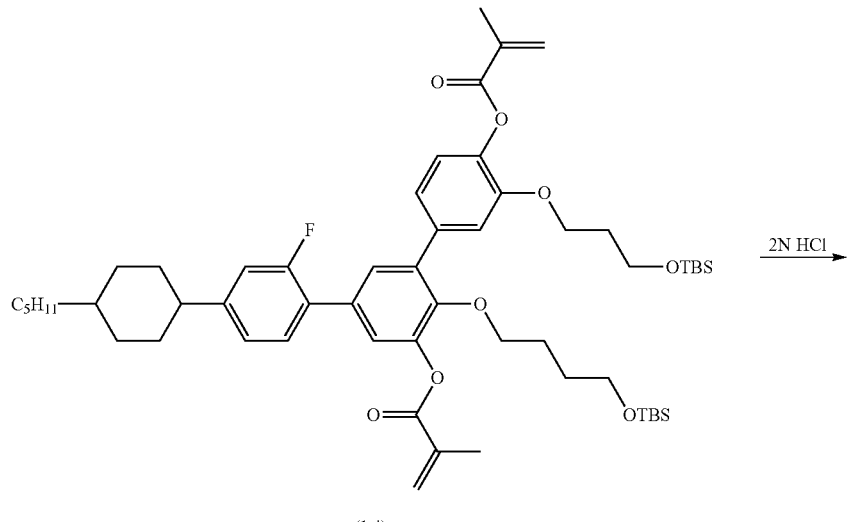

(1-j)

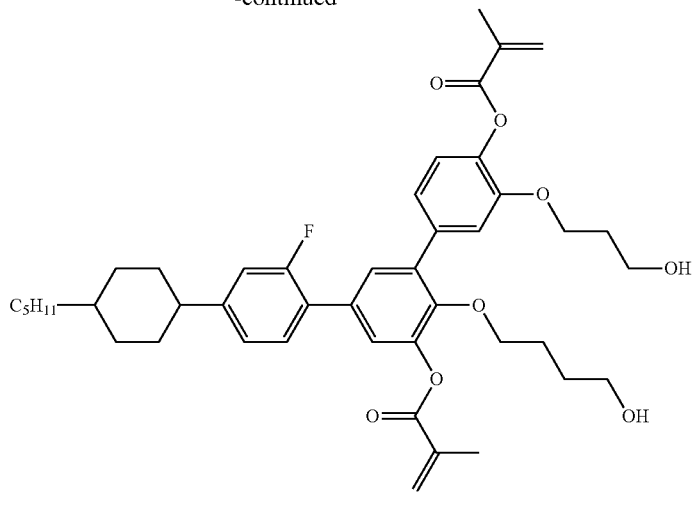

I-1

15.3 g (0.016 mol) of (1-j) is put into a 500 ml three-necked flask, 150 ml of tetrahydrofuran is added and cooled to 0° C., 9.5 ml (0.019 mol) of 2 N diluted hydrochloric acid is dropwise added slowly, and after the addition is complete, a stirred reaction is carried out for 3 hours.

200 ml of a saturated sodium bicarbonate aqueous solution is added under cooling condition, methyl tert-butyl ether is added for extraction, an organic phase is separated, washed with water until neutral, dried over anhydrous sodium sulfate and then subjected to spin drying to remove the solvent, and after recrystallization from toluene+ethanol, 8.2 g of a white solid (I-1) is obtained, with HPLC: 97.1% and a yield of 70%.

Example 2

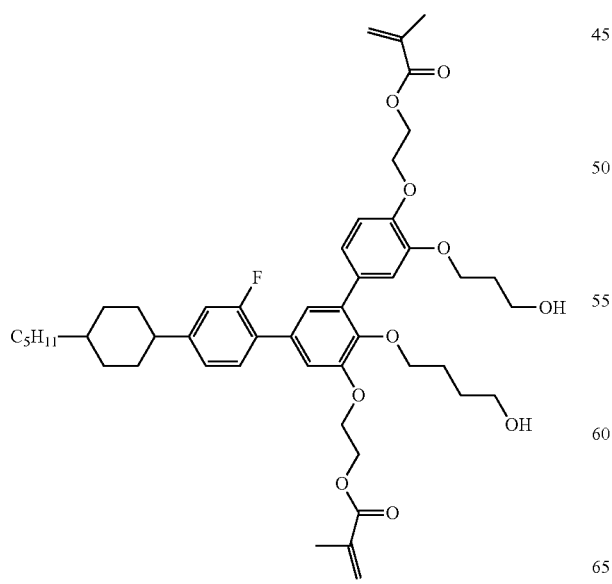

I-13

Step 1

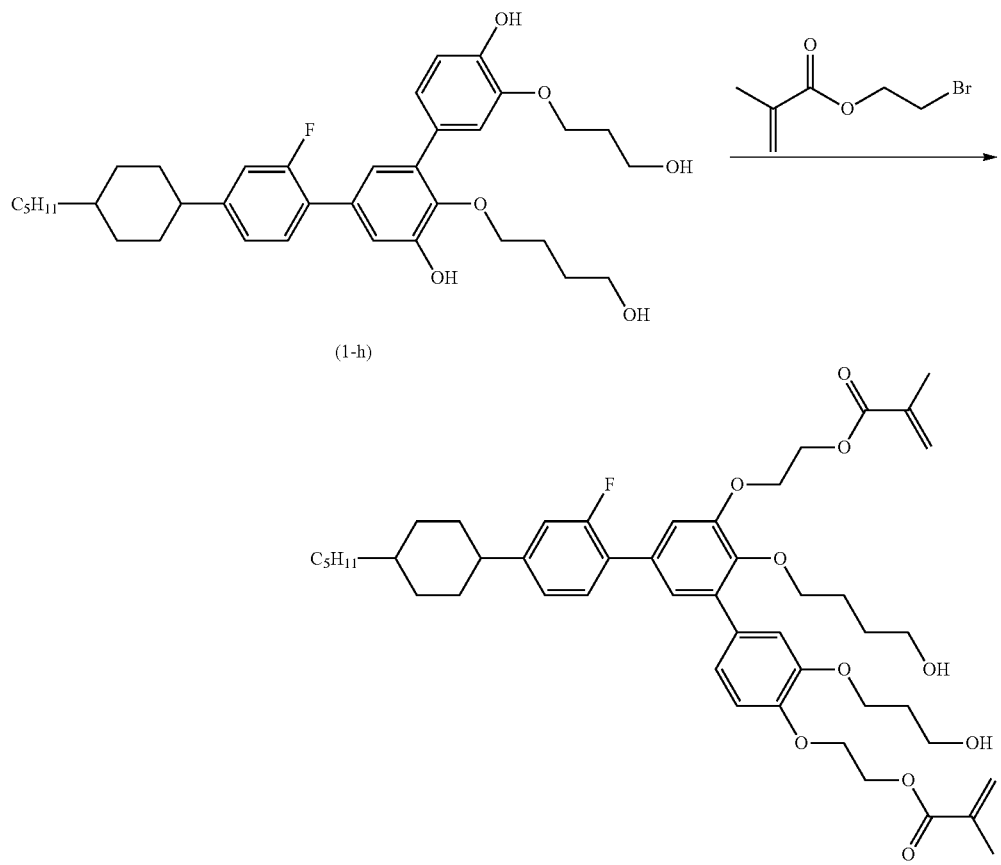

22.1 g (0.037 mol) of an off-white solid (1-h) as a raw material is dissolved in 200 ml of DMF, 15.3 g of potassium carbonate and 21.4 g (0.111 mol) of 2-bromoethyl methacrylate are added, and a reaction is carried out at 70° C. for 6 hours.

The product is poured to 300 ml of water, toluene extraction is carried out, the organic phase is washed with water, dried over anhydrous sodium sulfate and then subjected to spin drying to remove the solvent, and after recrystallization from ethanol, 15.4 g of a compound is obtained, with GC: 98.7% and a yield of 51%.

Example 3

| Category | Liquid crystal monomer code | Content (%) |
|---|---|---|
| III | CY-3-O4 | 11 |
| III | PY-3-O2 | 9 |
| III | CPY-3-O2 | 12 |
| III | CCOY-2-O2 | 8 |
| III | CCY-5-O2 | 10 |
| II | CC-3-V | 20 |
| II | CC-3-2 | 28.8 |
| I | I-1 | 1.2 |

Δε [1 KHz, 20° C.]: −3.1
Δn [589 nm, 20° C.]: 0.0887
Cp: 78° C.
γ$_1$: 81 mPa · s.

Example 4

| Category | Liquid crystal monomer code | Content (%) |
|---|---|---|
| III | CY-3-O2 | 11 |
| III | PY-C(5)-O2 | 9 |
| III | COY-3-O2 | 12 |
| III | CCOY-2-O2 | 8 |
| II | PP-1-5 | 10 |
| II | CC-3-V1 | 15 |
| II | CC-3-2 | 5 |
| V | CCP-3-1 | 12 |
| V | CPP-3-2 | 11 |
| VI | VI-1 | 0.3 |
| I | I-13 | 1.7 |

Δε [1 KHz, 20° C.]: −2.9
Δn [589 nm, 20° C.]: 0.106
Cp: 65° C.
γ$_1$: 82 mPa · s.

Example 5

| Category | Liquid crystal monomer code | Content (%) |
|---|---|---|
| III | CY-5-O2 | 11 |
| III | PY-3-O2 | 9 |
| III | COY-3-O2 | 16 |
| IV | Sc-C(5) O-O4 | 4 |

-continued

| Category | Liquid crystal monomer code | Content (%) |
|---|---|---|
| II | PP-1-5 | 10 |
| II | CC-3-V1 | 25 |
| II | CC-3-2 | 5 |
| V | CCP-3-1 | 12 |
| V | CPP-3-2 | 6 |
| I | I-13 | 1.6 |
| VI | VI-3 | 0.4 |

Δε [1 KHz, 20° C.]: −2.8
Δn [589 nm, 20° C.]: 0.097
Cp: 60° C.
$\gamma_1$: 56 mPa · s.

Example 6

| Category | Liquid crystal monomer code | Content (%) |
|---|---|---|
| III | CY-C(5)-O2 | 11 |
| III | PY-3O-O2 | 10 |
| III | CCOY-3-O2 | 12 |
| III | CCOY-5-O2 | 13 |
| IV | Sb-C(5) O-O4 | 4 |
| II | PP-1-5 | 10 |
| II | CC-3-V | 20 |
| II | CC-3-V1 | 10 |
| V | CCP-3-O1 | 7.5 |
| VI | VI-1 | 0.3 |
| I | I-1 | 2.2 |

Δε [1 KHz, 20° C.]: −3.88
Δn [589 nm, 20° C.]: 0.102
Cp: 85° C.
$\gamma_1$: 110.s.
After storage at −20° C. for 120 hours at low temperatures, no polymerizable monomer is precipitated out Example 7

The liquid crystal composition of Example 6 is poured into a test cell (there is no polyimide alignment layer, the thickness of the cell is 4 μm, there is an ITO electrode on the surface of the substrate, and there is no passivation layer), the liquid crystal is spontaneously aligned vertically, and the vertical alignment is stable at 0-80° C.

A voltage of 15 V is applied to both sides of the test cell, UV irradiation (a main wavelength of 313 nm) is carried out for 200 s, with 0.55 mw/cm², the voltage is then removed, and the irradiation is carried out at a light intensity of 0.20 mw/cm² for 100 min, such that the polymer is completely polymerized, pre-tilt is established and stably present, and the liquid crystal cell can be reversibly switched by applying a voltage.

In an environment of a temperature of 78° C.-80° C., the liquid crystal cell is continuously applied with a voltage and switched between dark state and bright state for 500 hours, and the pre-tilt is stably present.

After the compound of formula I is polymerized, the insulation effect of PI can be achieved, and vertical alignment can be realized; polymerization takes place under voltage application conditions, and after the voltage is removed, the polymer layer can provide a sustained and stable pre-tilt, and the pre-tilt of liquid crystal molecules is very favorable for improving the response speed of the liquid crystal in an electric field.

The disclosed self-alignment polymerizable compound has a linear main structure, and the compound of formula I of the present patent has a curved main structure; in addition, the distribution of the two hydroxy groups on the two ring structures can achieve a good anchoring effect; furthermore, it has a good solubility, does not easily precipitate from the liquid crystal at low temperatures, and has better low-temperature storage properties.

The invention claimed is:

1. A liquid crystal composition, comprising one or more compounds represented by formula I-1 to I-34; one or more compounds represented by formula II-1 to II-14; and one or more compounds represented by formula III-1 to III-11:

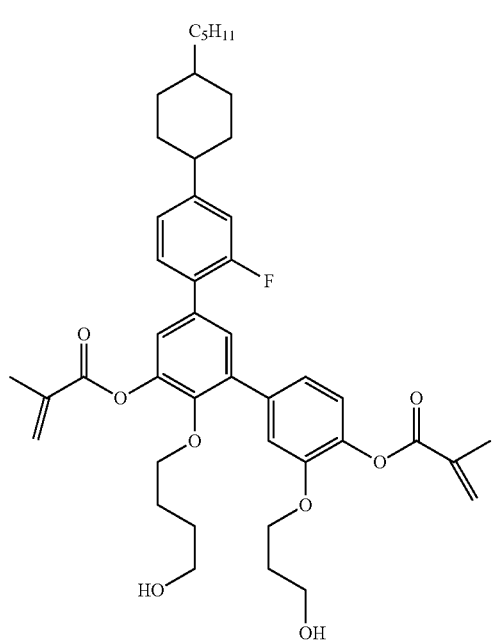

I-1

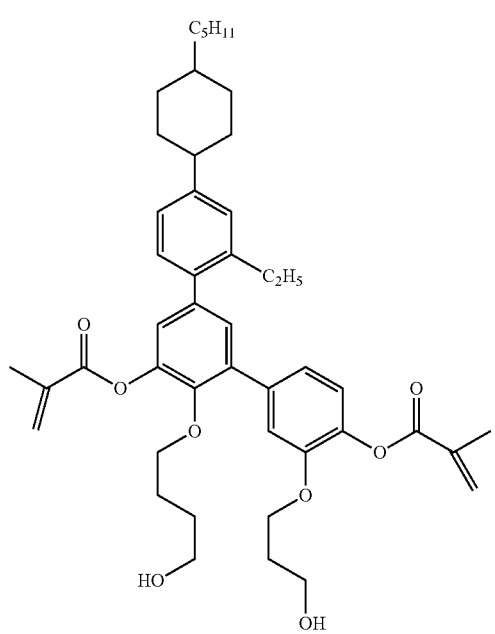

I-2

I-3
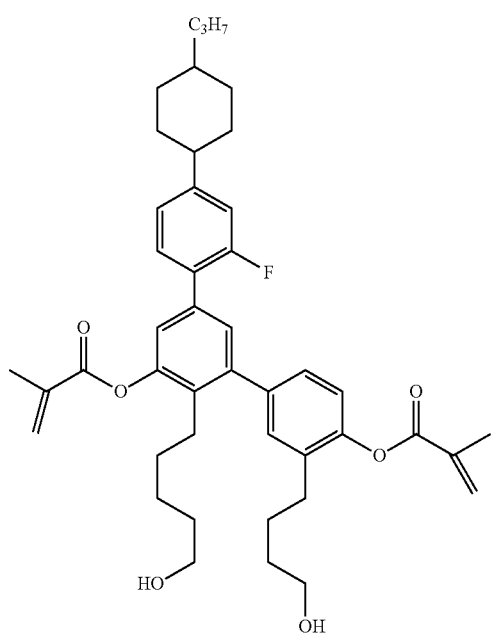
I-5
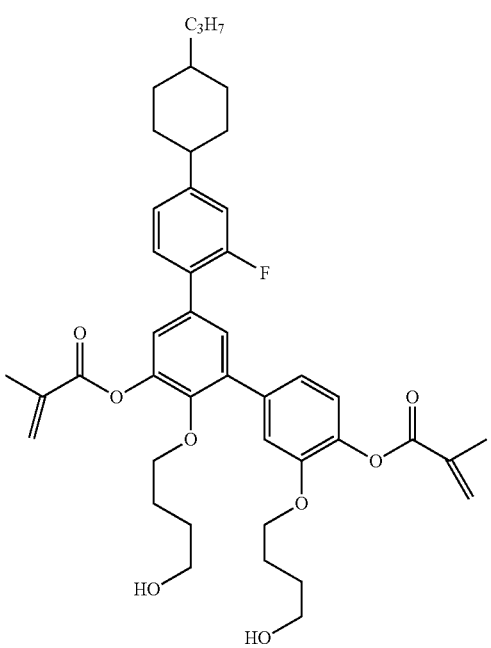
I-4
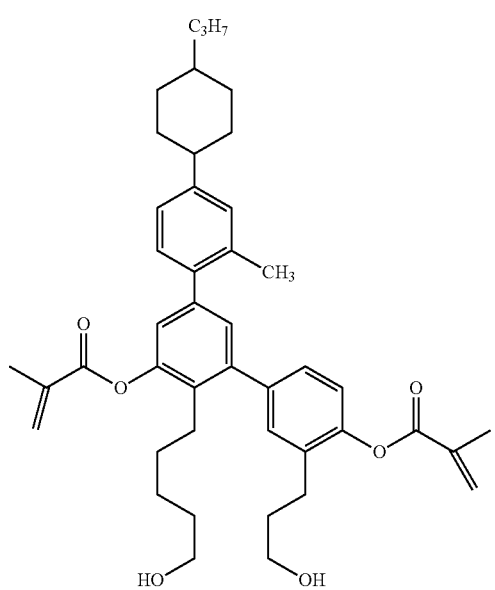
I-6
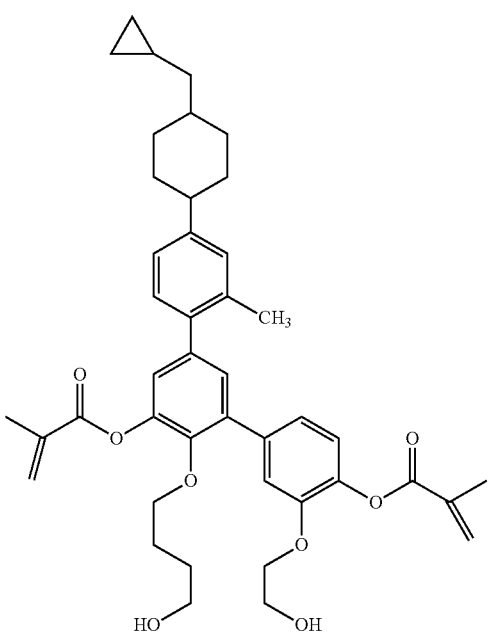

-continued
I-7
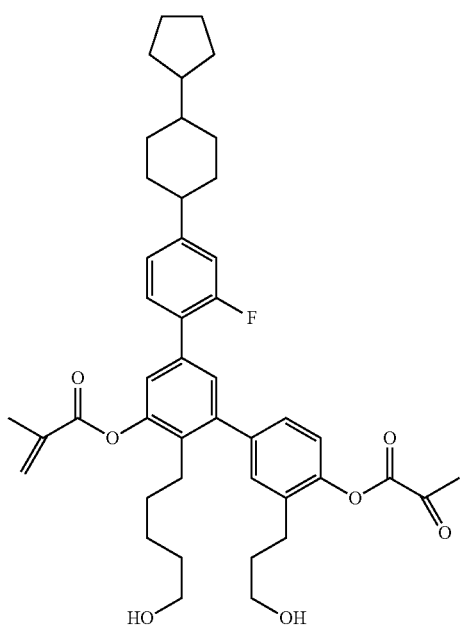
I-9
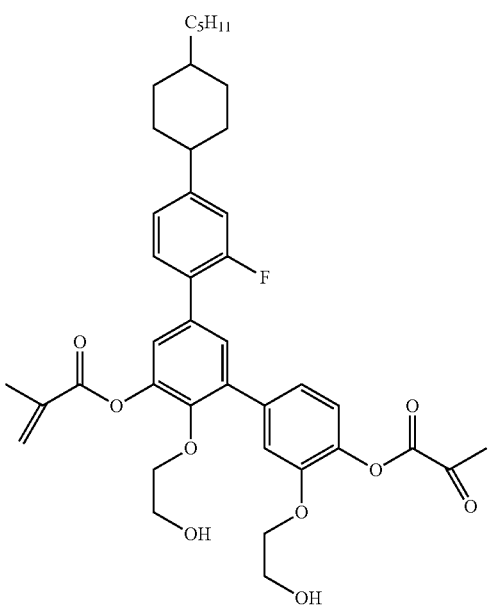
I-8
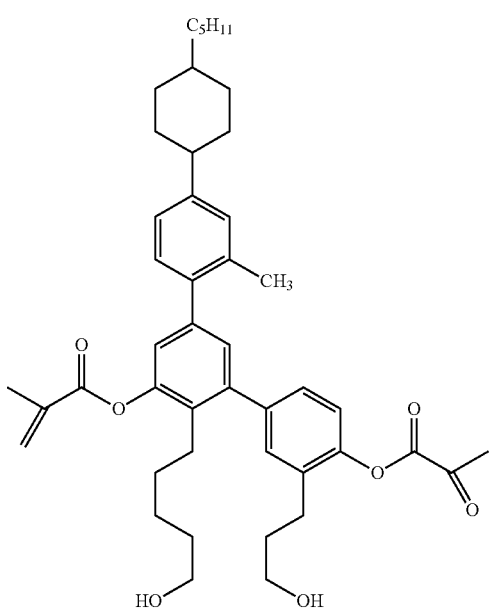
I-10
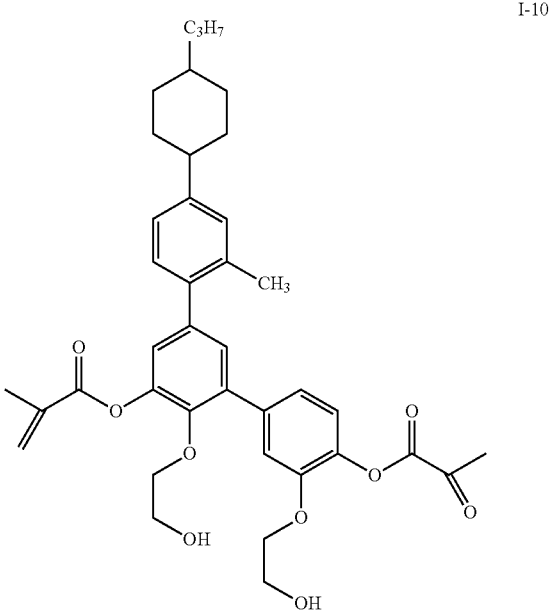

I-11
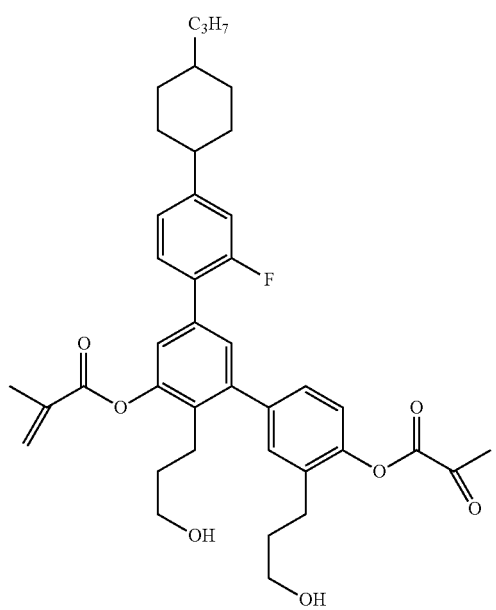
I-12
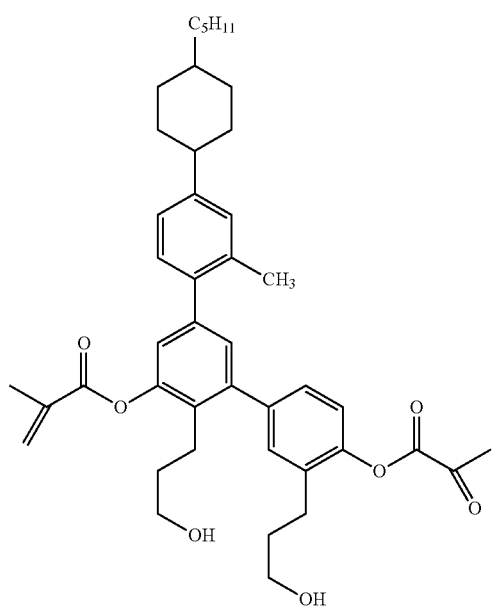
I-13
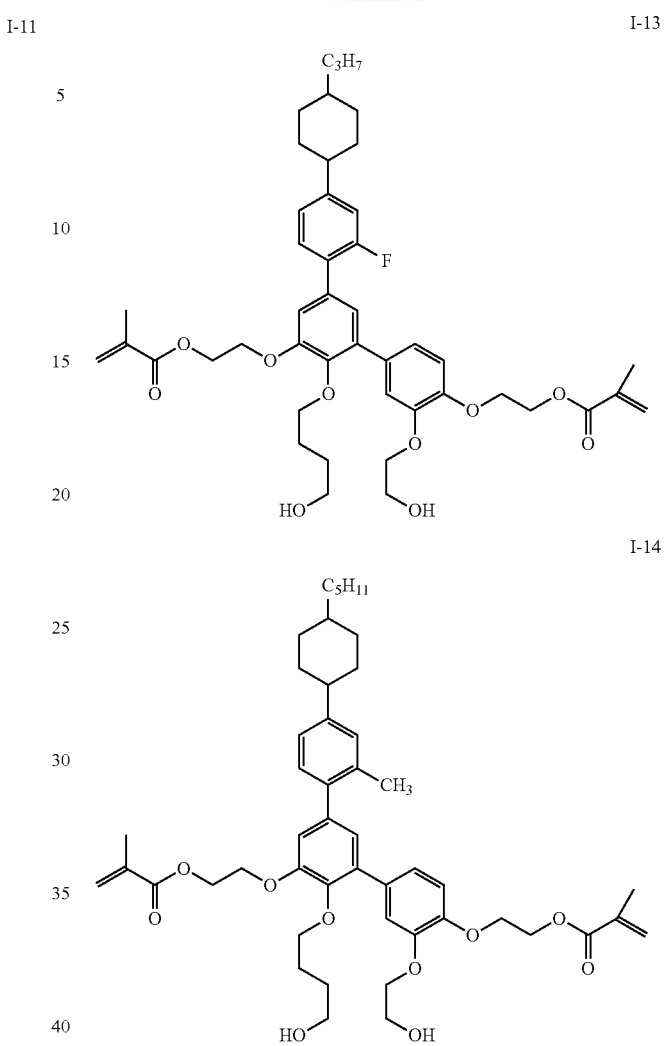
I-14
I-15
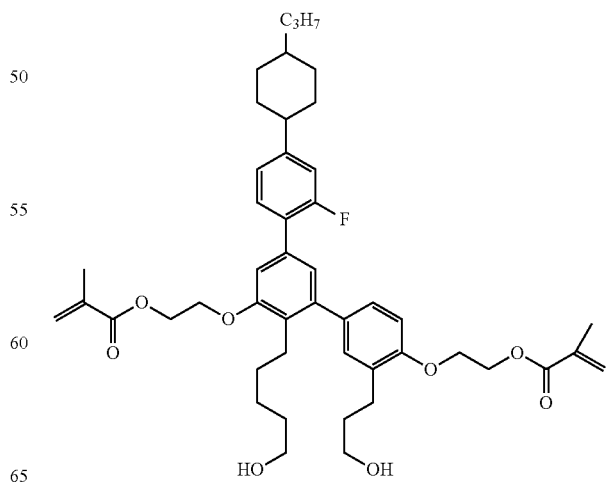

-continued
I-16
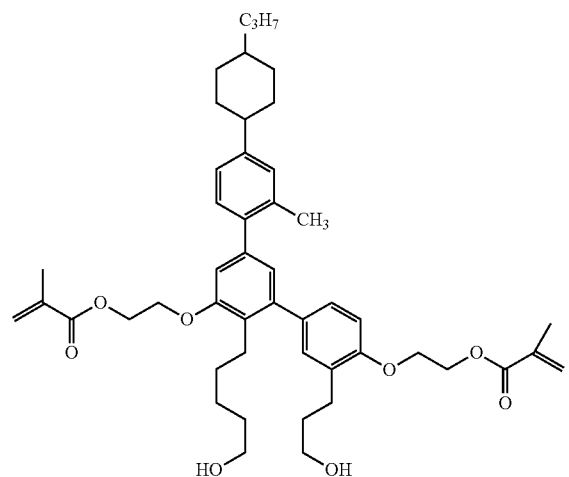
I-18
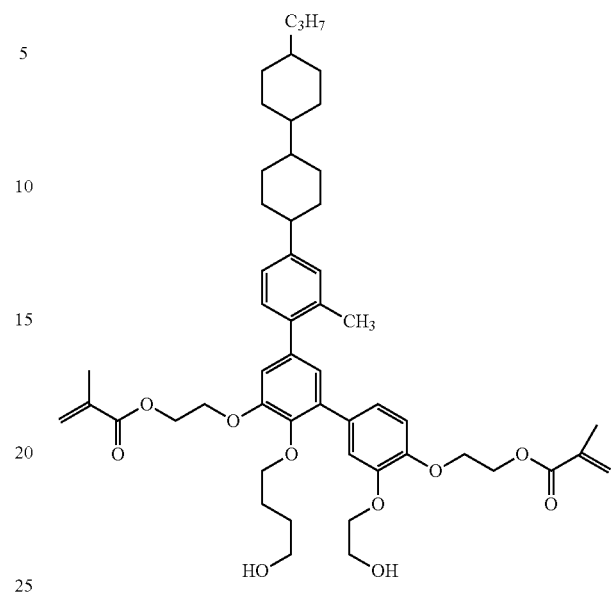
I-17
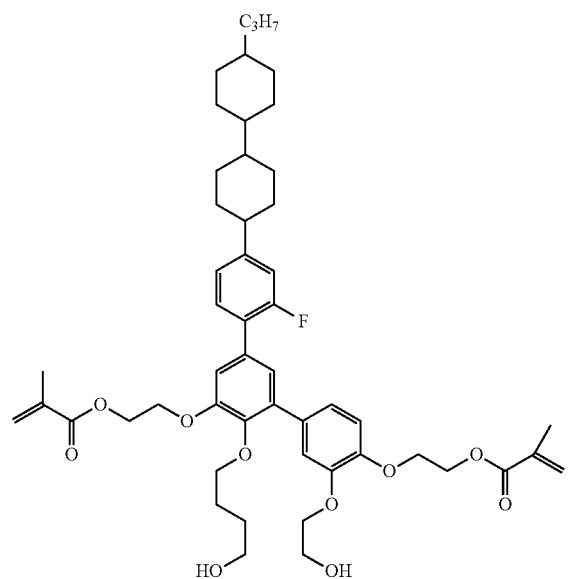
I-19
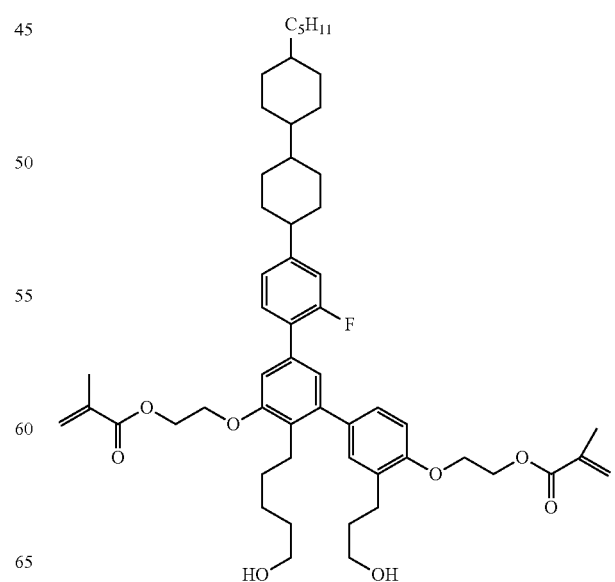

I-20
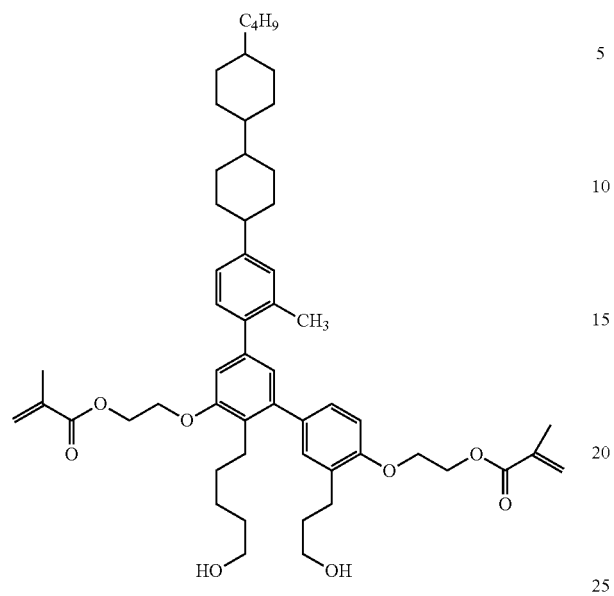
I-21
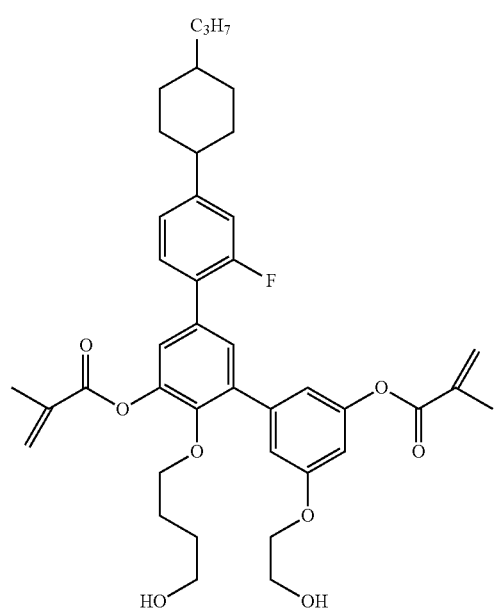
I-22
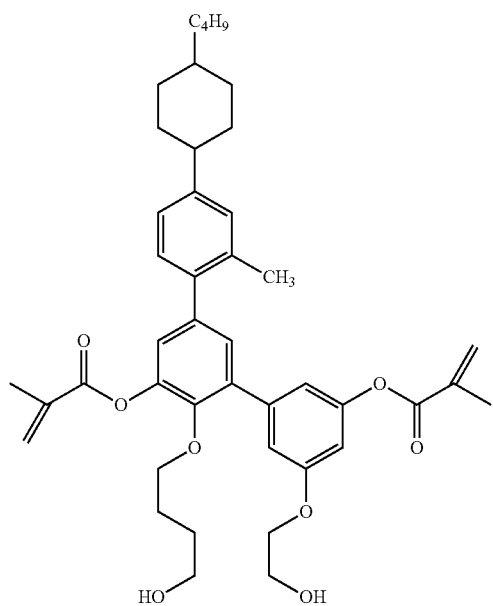
I-23
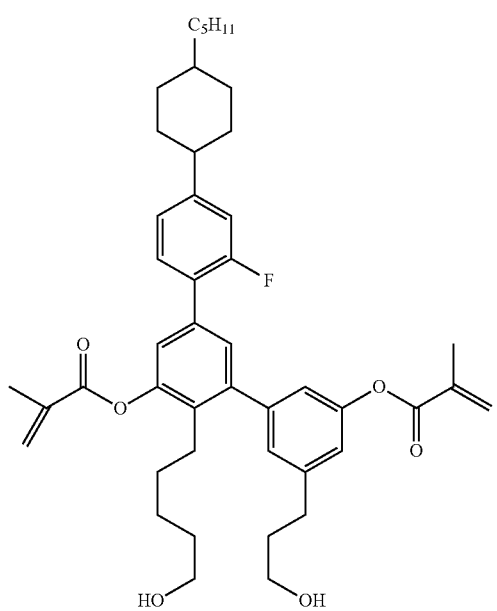

I-24
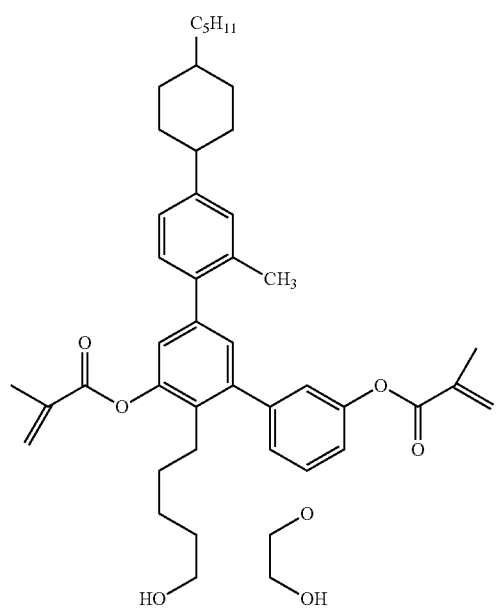
I-25
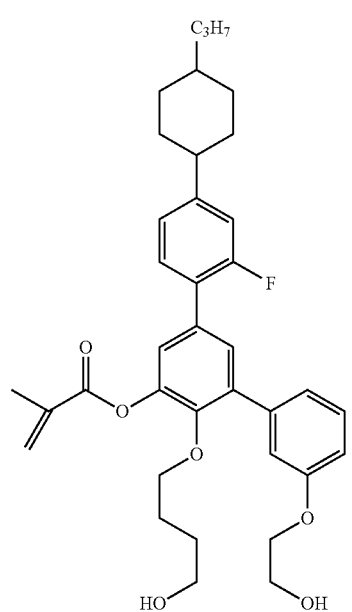
I-26
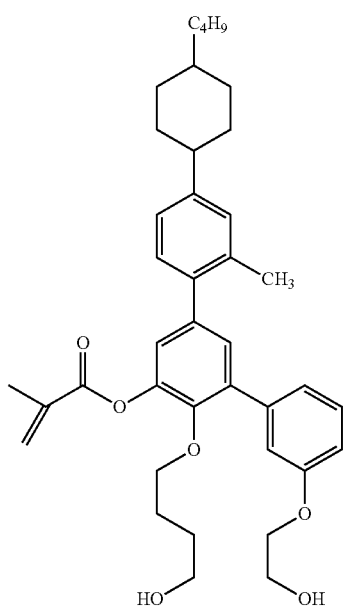
I-27
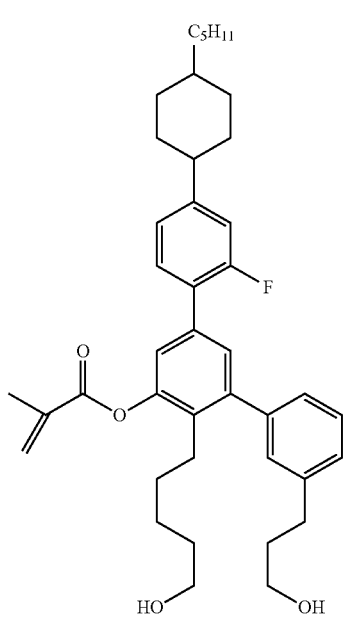

I-28
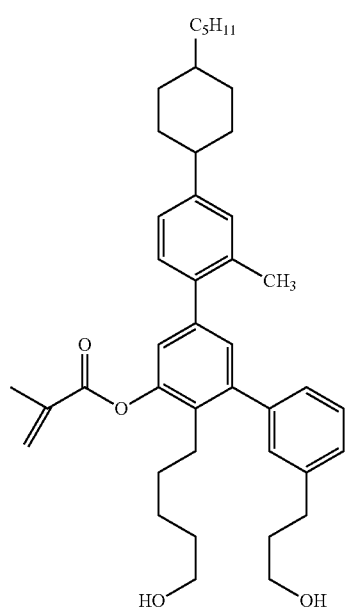
I-30
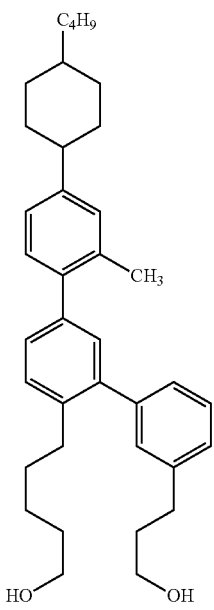
I-29
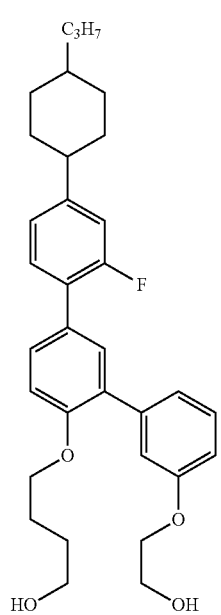
I-31
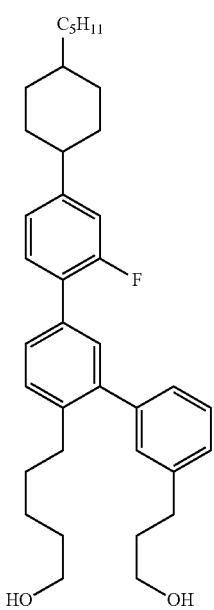

I-32
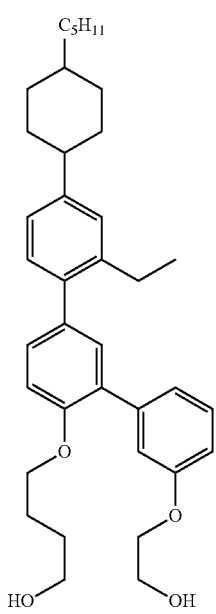
I-33
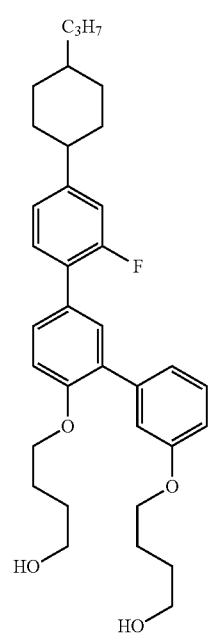
I-34
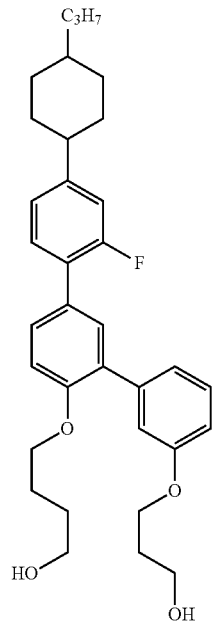
II-1
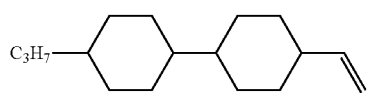
II-2
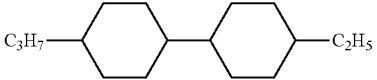
II-3
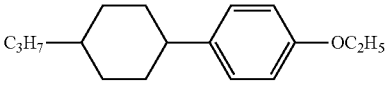
II-4
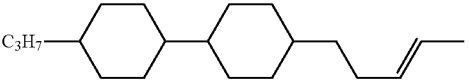
II-5
II-6
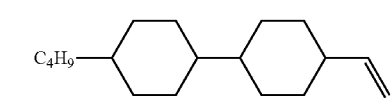
II-7
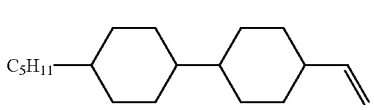
II-8
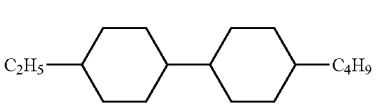
II-9
II-10
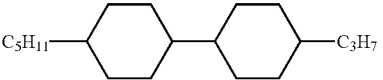

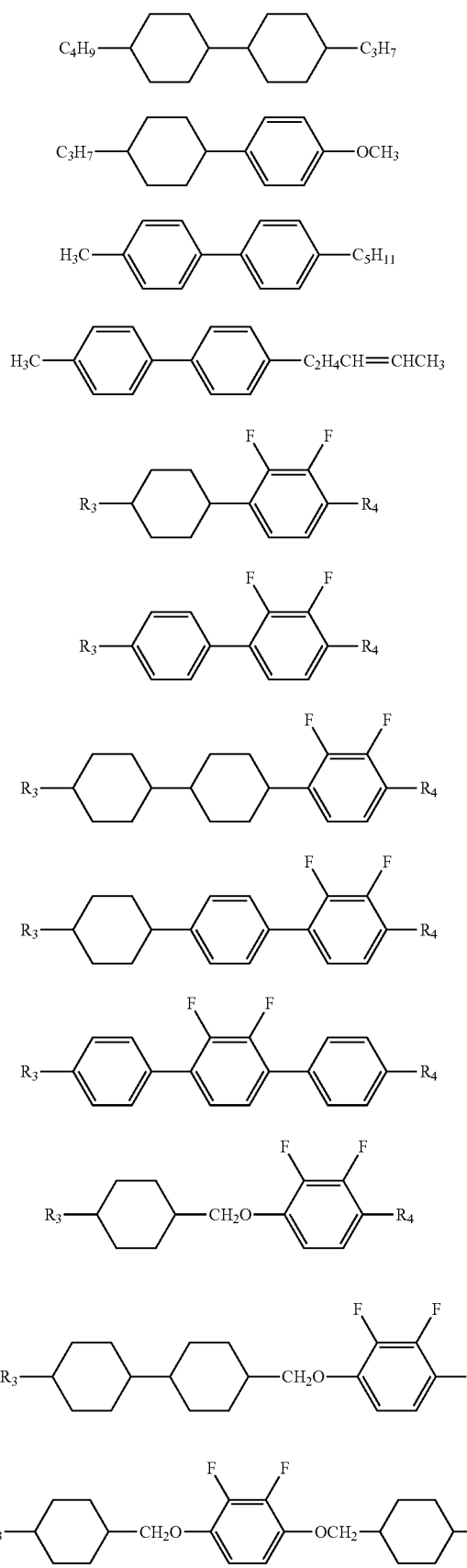
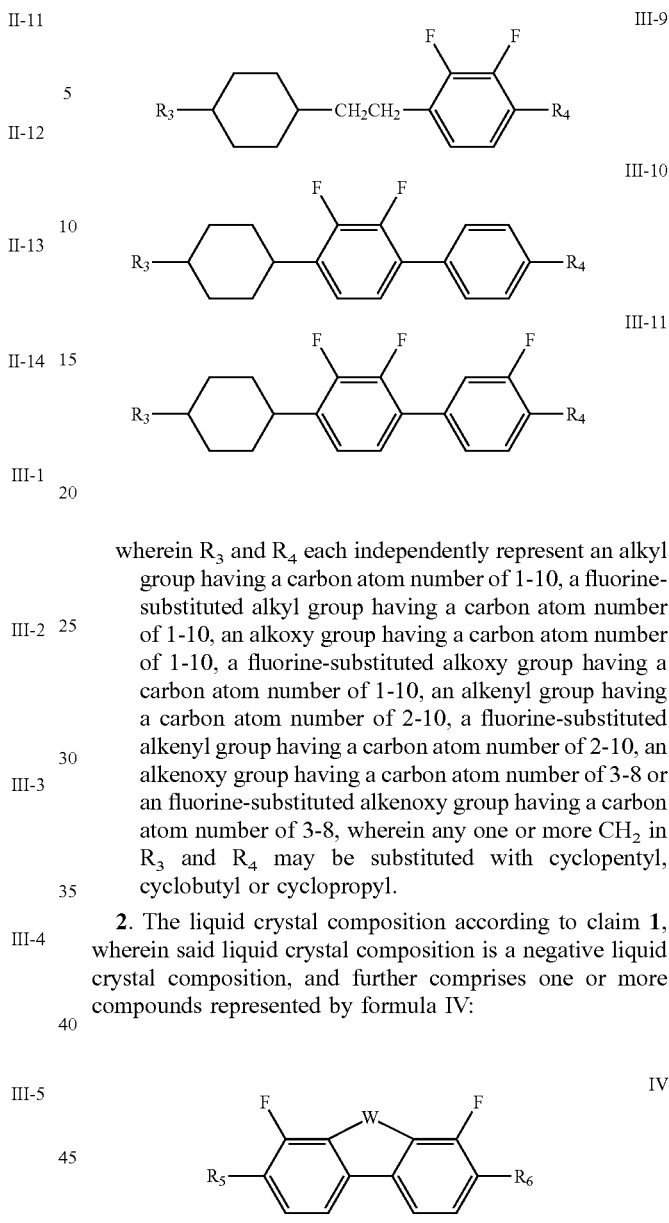

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in $R_3$ and $R_4$ may be substituted with cyclopentyl, cyclobutyl or cyclopropyl.

2. The liquid crystal composition according to claim 1, wherein said liquid crystal composition is a negative liquid crystal composition, and further comprises one or more compounds represented by formula IV:

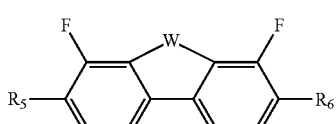

wherein $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, wherein any one or more $CH_2$ in the groups represented by $R_5$ and $R_6$ may be replaced by cyclopentyl, cyclobutyl or cyclopropyl; and W represents O, S or —CH2O—.

3. The liquid crystal composition according to claim 1, wherein said liquid crystal composition further comprises one or more compounds represented by formula V:

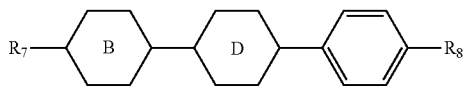

V wherein $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8:

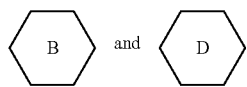

each independently represent 1,4-phenylene, 1,4-cyclohexylene, or 1,4-cyclohexenylene.

4. The liquid crystal composition according to claim 1, wherein said liquid crystal composition further comprises one or more polymerizable compounds represented by formula VI:

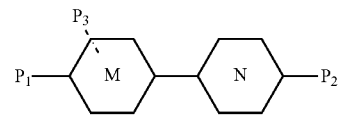

VI wherein

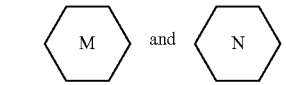

each independently represent phenylene, fluorinated phenylene, or indanyl; and $P_1$, $P_2$, and $P_3$ each independently represent a methacrylate group or an acrylate group.

5. A liquid crystal display element or liquid crystal display comprising the liquid crystal compound or liquid crystal composition of claim 1, said display element or display being an active matrix display element or display or a passive matrix display element or display.

6. The liquid crystal display element or liquid crystal display according to claim 5, wherein said active matrix display element or display is a PSVA-TFT liquid crystal display element or display without a PI alignment layer.

* * * * *